Feb. 28, 1956 G. L. FISK 2,736,425
FLYING TRACTION VISE
Filed Dec. 6, 1949 16 Sheets-Sheet 1

INVENTOR
Gustaf L. Fisk

Feb. 28, 1956 G. L. FISK 2,736,425
FLYING TRACTION VISE
Filed Dec. 6, 1949 16 Sheets-Sheet 3

INVENTOR
Gustaf L. Fisk

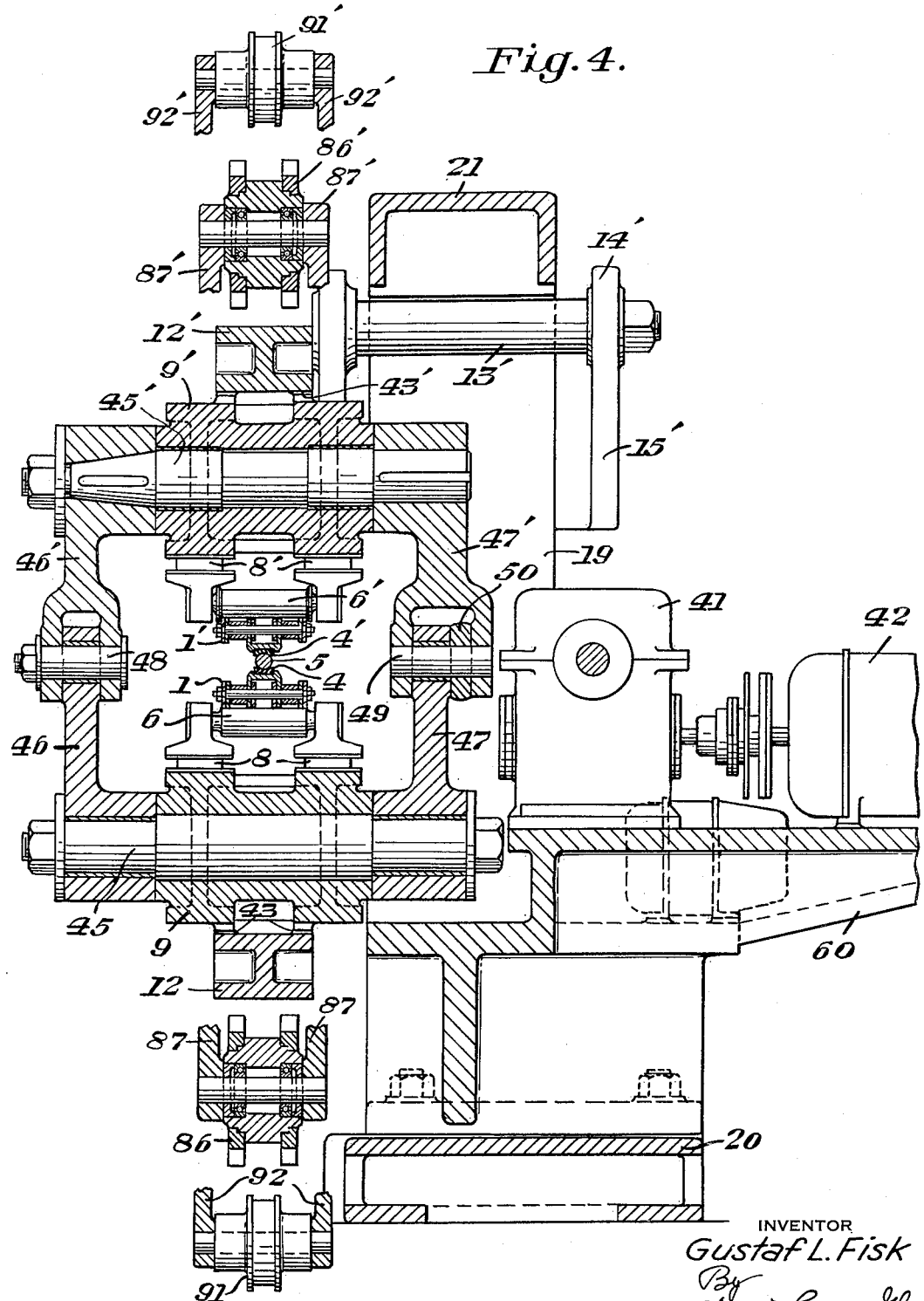

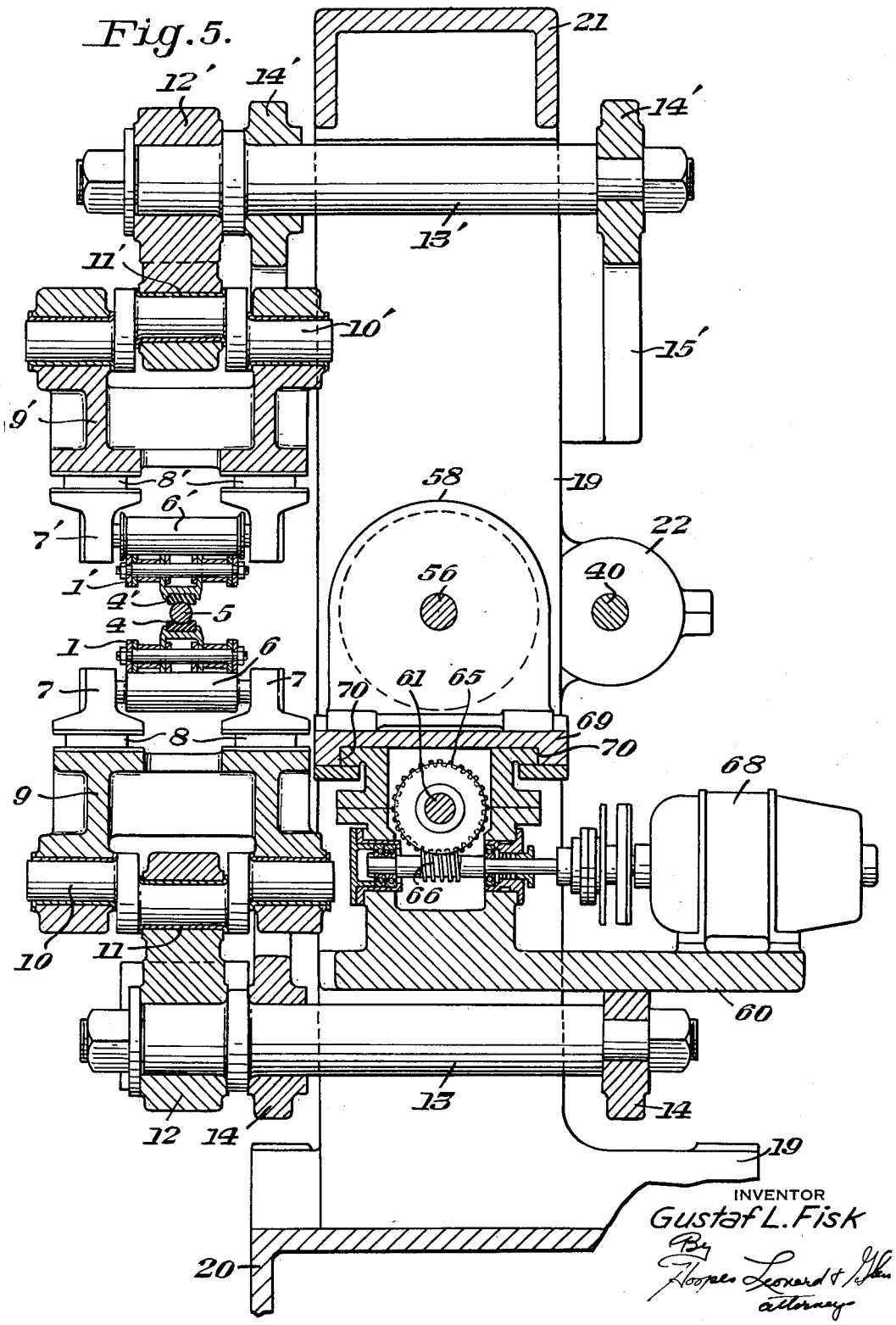

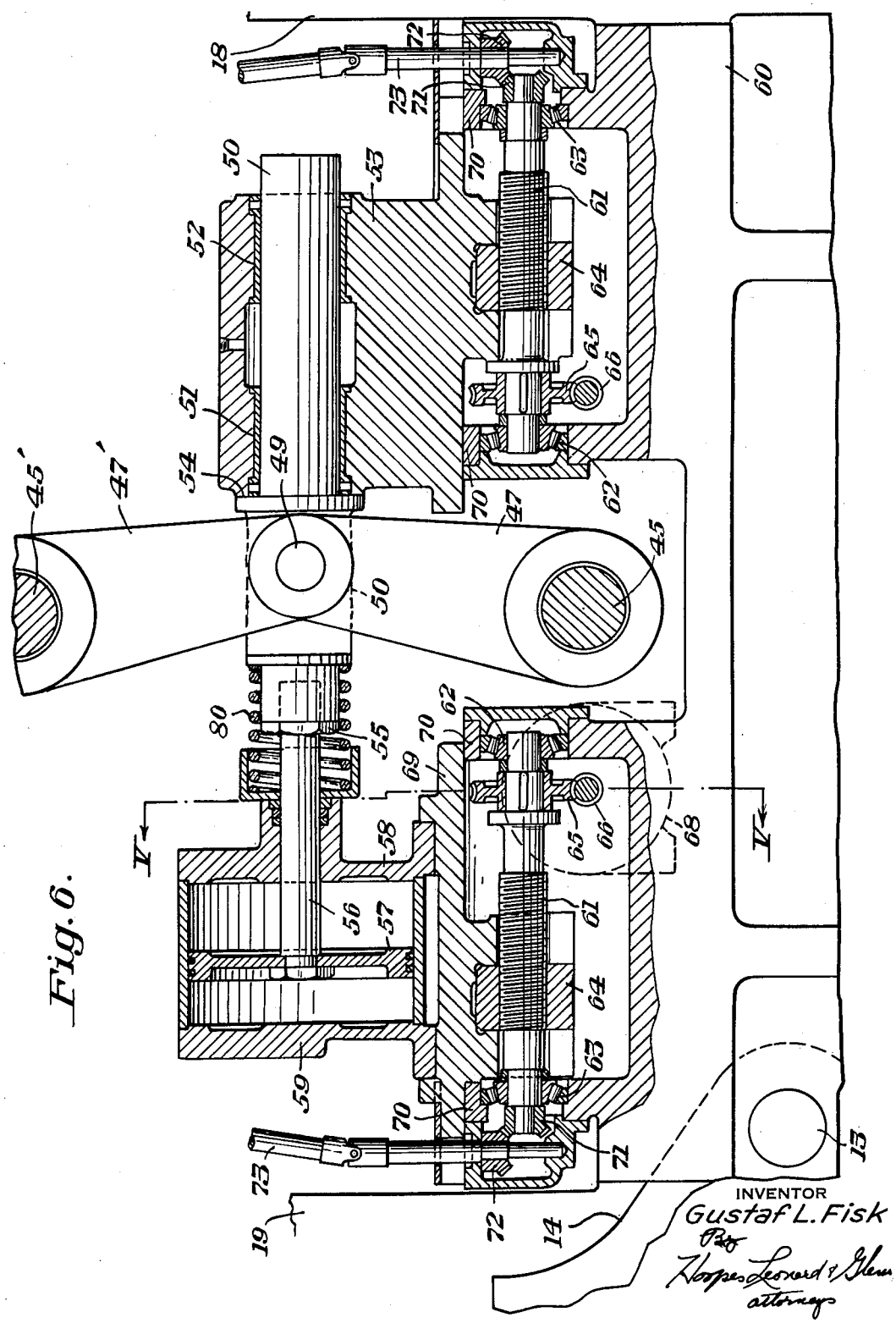

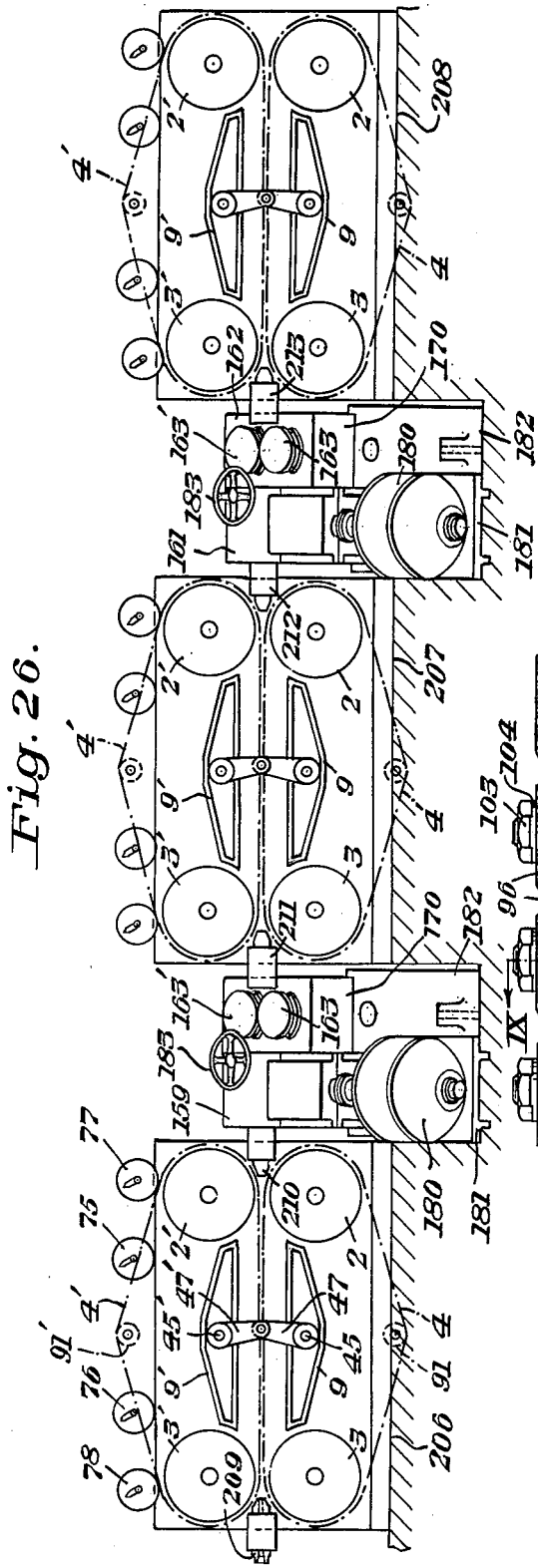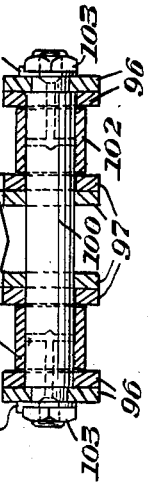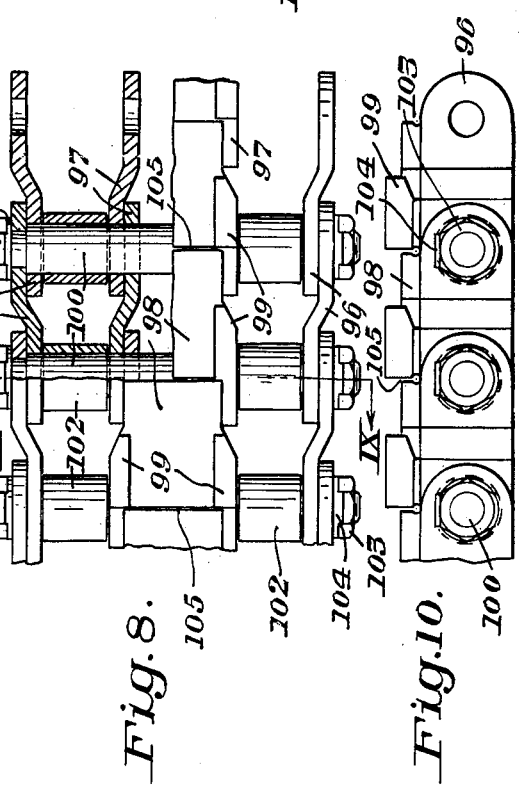

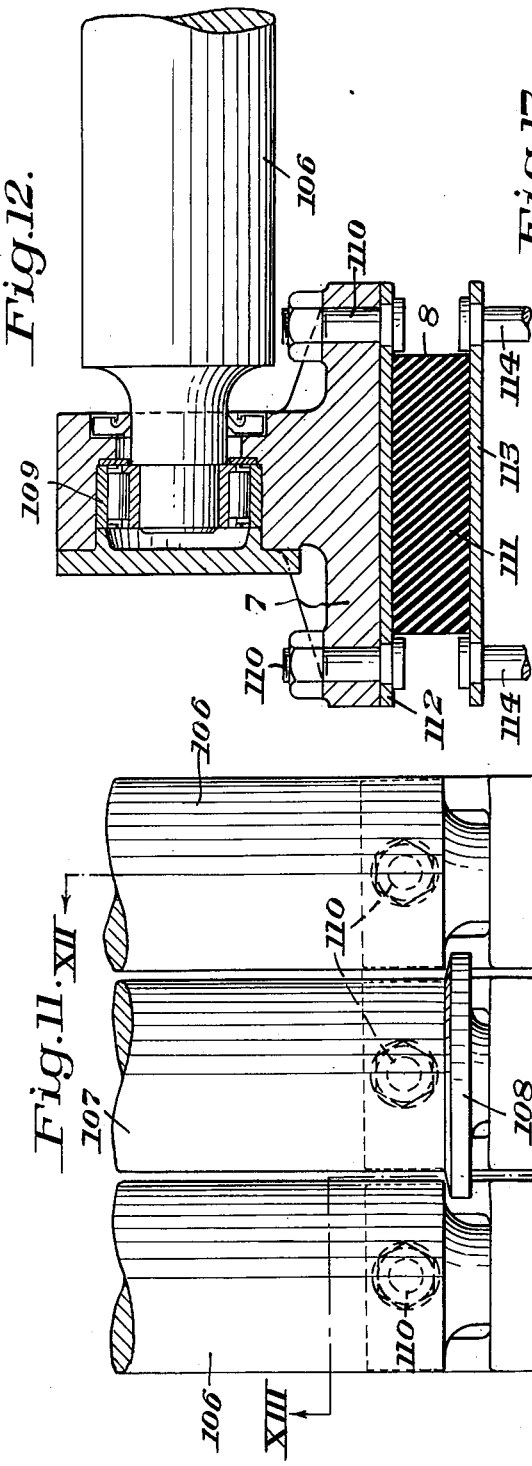

INVENTOR
Gustaf L. Fisk

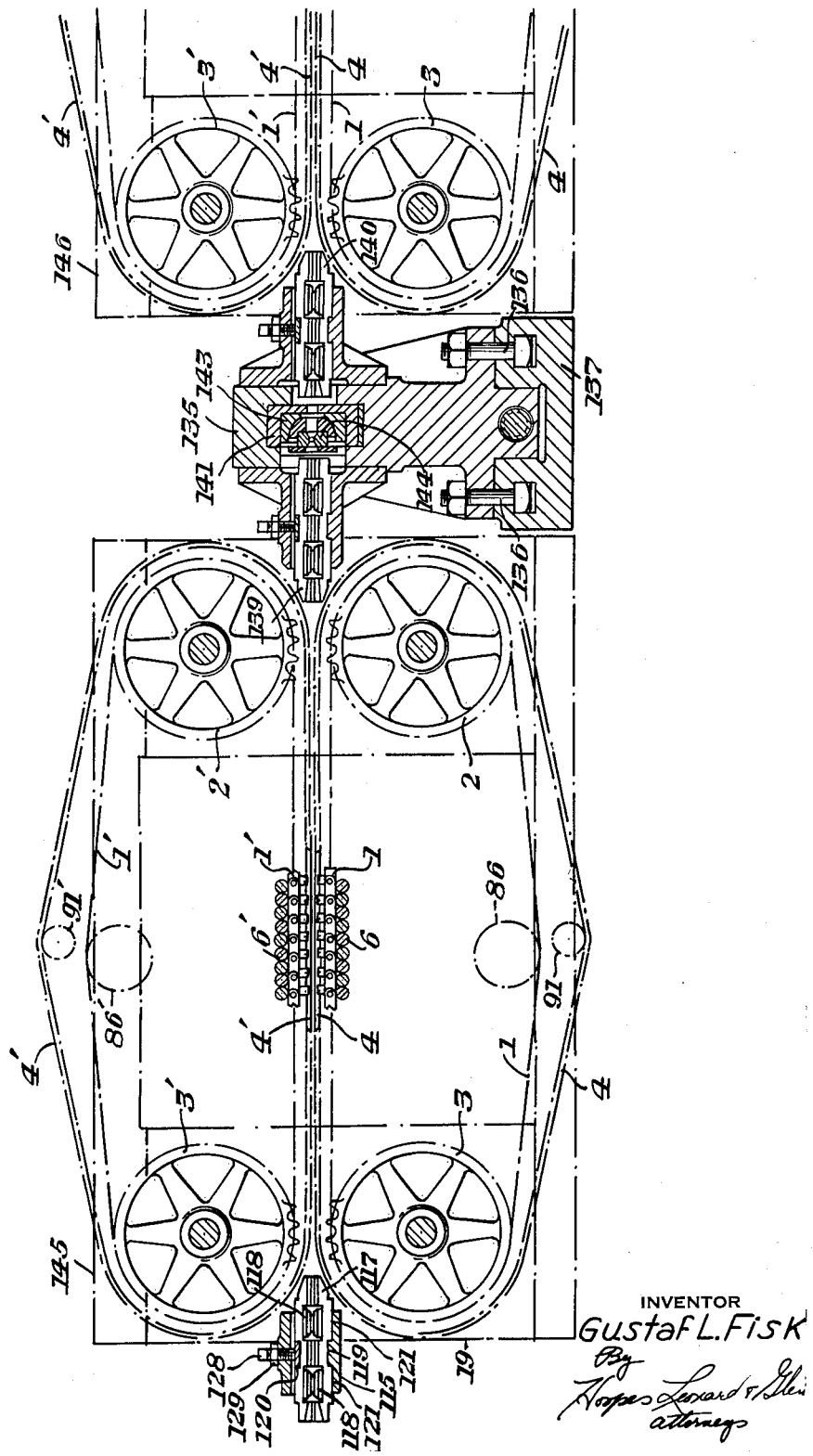

Feb. 28, 1956  G. L. FISK  2,736,425
FLYING TRACTION VISE
Filed Dec. 6, 1949  16 Sheets-Sheet 11

INVENTOR
Gustaf L. Fisk

Feb. 28, 1956 G. L. FISK 2,736,425
FLYING TRACTION VISE
Filed Dec. 6, 1949 16 Sheets-Sheet 12

INVENTOR
Gustaf L. Fisk

Feb. 28, 1956
G. L. FISK
2,736,425
FLYING TRACTION VISE
Filed Dec. 6, 1949
16 Sheets-Sheet 13
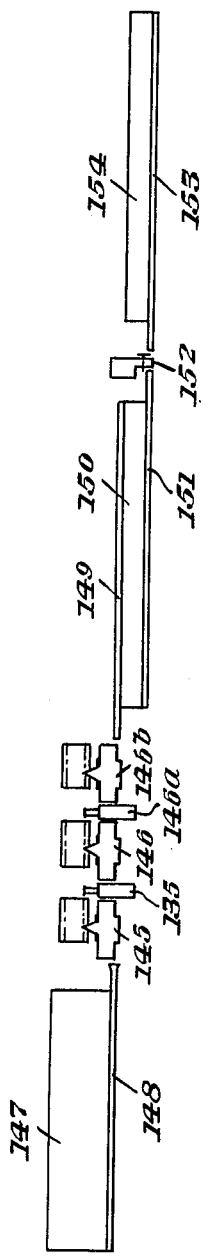
Fig. 22.
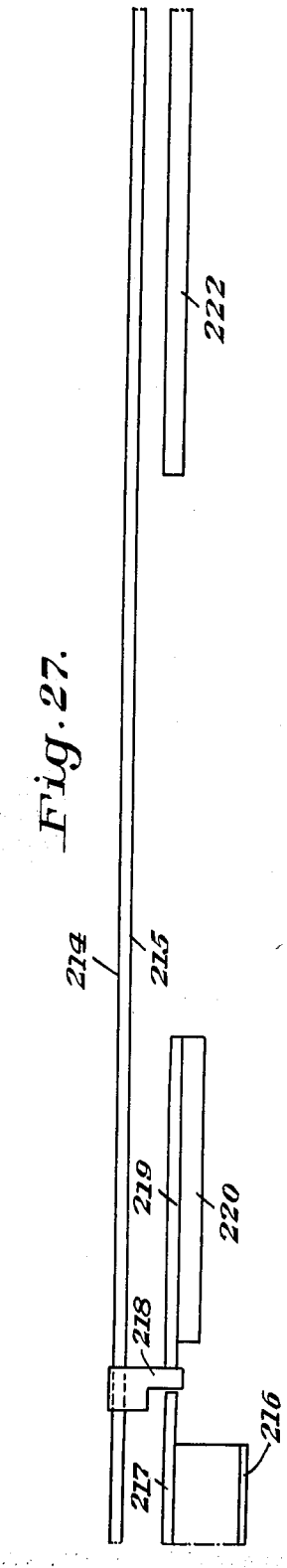
Fig. 27.
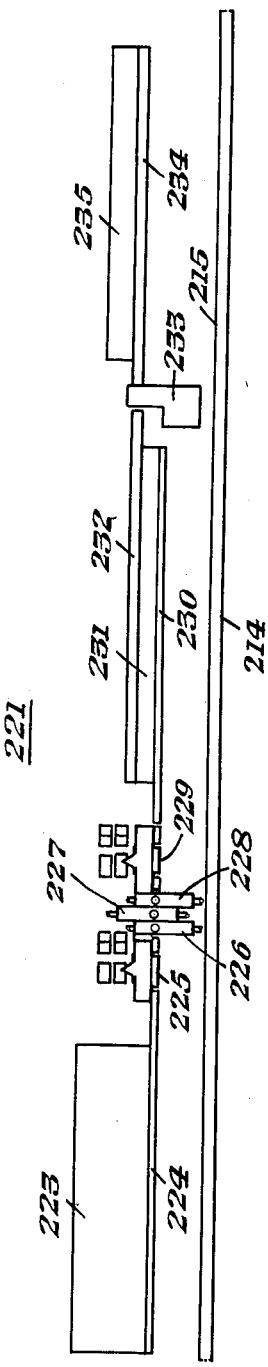
INVENTOR
Gustaf L. Fisk
By
Hoopes Leonard & Glenn
attorneys

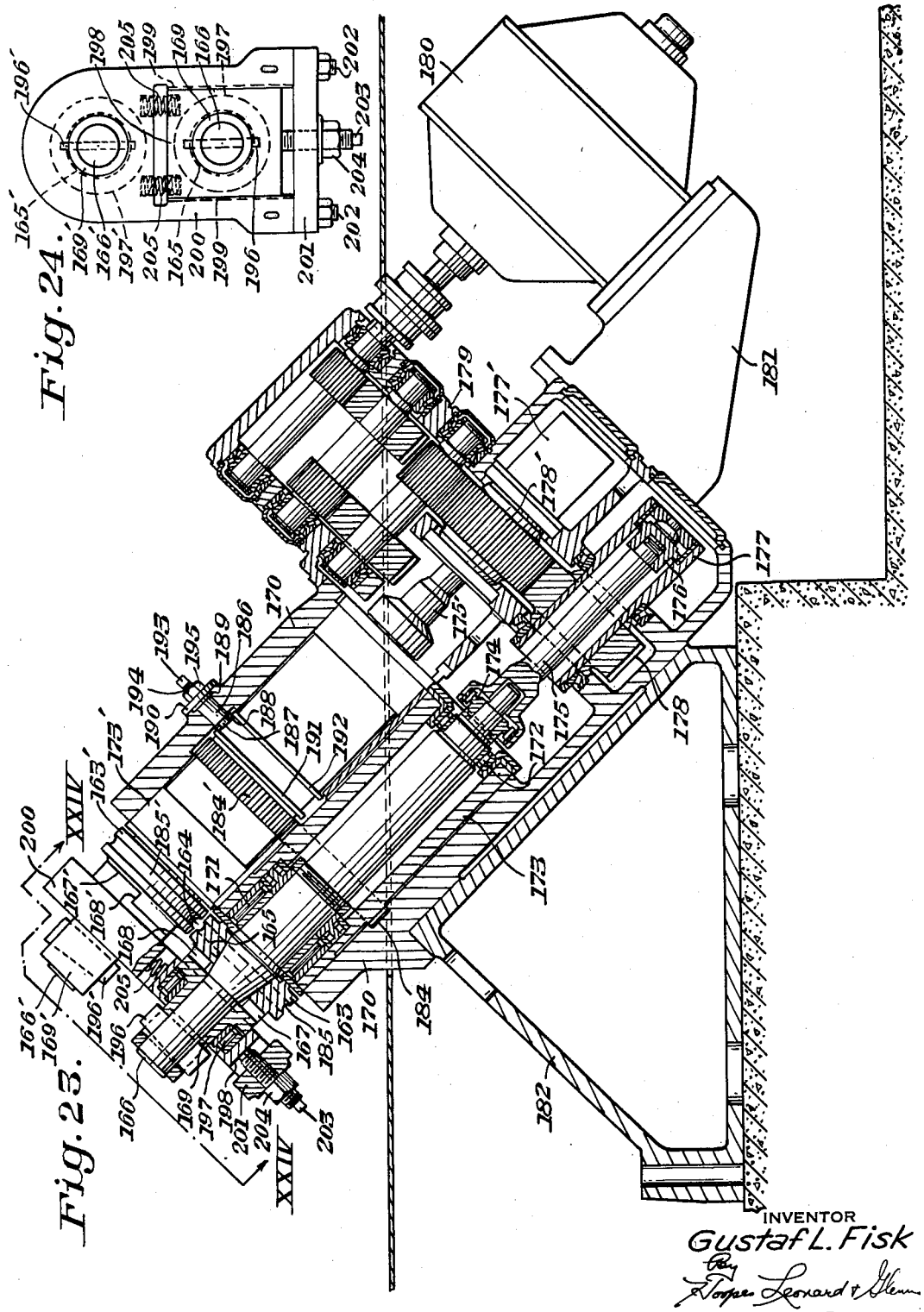

Feb. 28, 1956 G. L. FISK 2,736,425
FLYING TRACTION VISE
Filed Dec. 6, 1949 16 Sheets-Sheet 15

INVENTOR
Gustaf L. Fisk
By Hooper Leonard & Glenn
attorneys

Feb. 28, 1956 G. L. FISK 2,736,425

FLYING TRACTION VISE

Filed Dec. 6, 1949 16 Sheets-Sheet 16

INVENTOR
Gustaf L. Fisk
By Hoopes Leonard & Glenn
attorneys

United States Patent Office 2,736,425
Patented Feb. 28, 1956

2,736,425

FLYING TRACTION VISE

Gustaf L. Fisk, New Fairfield, Conn.; Hazel S. Fisk, executrix of said Gustaf L. Fisk, deceased Application December 6, 1949, Serial No. 131,419

26 Claims. (Cl. 203—310)

This invention relates to a flying traction vise. It has to do primarily with a flying traction vise which is an improvement over the structures of my copending applications Serial No. 531,724, filed April 19, 1944, and now abandoned, and Serial No. 624,344, filed October 25, 1945, and now Patent No. 2,642,280.

My improved flying traction vise is for advancing elongated articles in the direction of the length thereof. While it is useful in the advancing lengthwise of elongated articles of many different kinds it has especial utility in the advancing of cold metal bars during cold reduction thereof. For purposes of explanation and illustration the invention will be described in connection with the cold working of merchant bars whereby they may be finished to precise dimensions within close tolerances and with improved physical properties. My flying traction vise may also be used in advancing metal tubes during the cold working thereof.

I provide traction apparatus which is quickly adjustable for size of bar and which dependably guides bars in their passage therethrough without the aid of extraneous guiding means. I preferably provide for adjustment for desired traction independently of adjustment for bar size. My apparatus preferably has a fixed pass line which is automatically maintained for all settings of the adjusting rigs. I desirably provide means for balancing the gripping forces applied to the bars as within the members of a toggle centered on the pass line so as to avoid cantilever loads on the frame of the machine, plus lessening the size, weight and cost of the apparatus.

I further provide for the very rapid, virtually instantaneous exchange of dies whereby substantially continuous cold drawing can be accomplished without overheating of dies. I still further provide a mill adapted to the use of overhung, demountable rolls, on drive shafts or idler shafts as the case may require, and suited to the heavy loads encountered in the cold rolling of bars, by supporting the roll shafts in bearings on both sides of the pass line at times of heavy bar reductions.

While my apparatus has certain features not common with the apparatus of my said copending applications it has numerous importantly improved features contributing to superior operation and improved results. Other details, objects and advantages of the invention will become apparent as the following description of certain present preferred embodiments thereof proceeds.

In the accompanying drawings I have shown certain present preferred embodiments of the invention in which Figure 1 is a view partly in elevation and partly in vertical cross section of a flying traction vise;

Figure 4 is a vertical transverse cross-sectional view taken on the line IV—IV of Figure 1;

Figure 5 is a vertical transverse cross-sectional view taken on the line V—V of Figure 1;

Figure 6 is a vertical longitudinal cross-sectional view taken on the line VI—VI of Figure 2;

Figure 8 is a detail view partly in plan and partly in cross section of the sprocket chain;

Figure 9 is a cross-sectional view taken on the line IX—IX of Figure 8;

Figure 10 is a side view of the chain shown in Figures 8 and 9;

Figure 11 is a fragmentary plan view of a portion of the means backing up the gripping means for pressing the gripping means against the work;

Figure 12 is a cross-sectional view taken on the line XII—XII of Figure 11;

Figure 13 is a view partly in elevation and partly in cross section on the line XIII—XIII of Figure 11;

Figure 36:
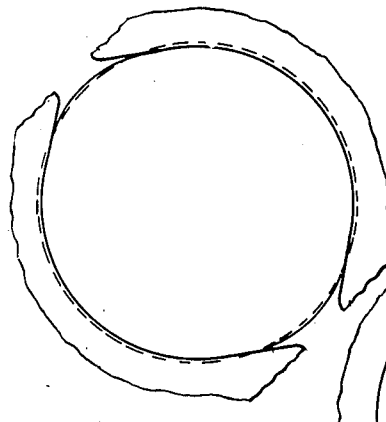
Figure 37:
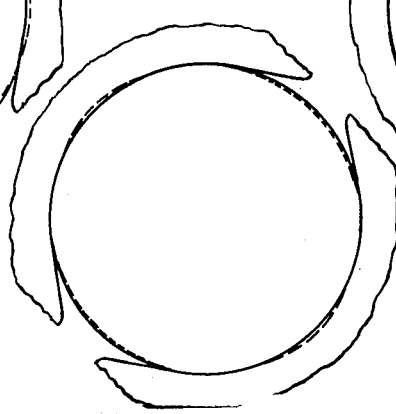
Figure 38:
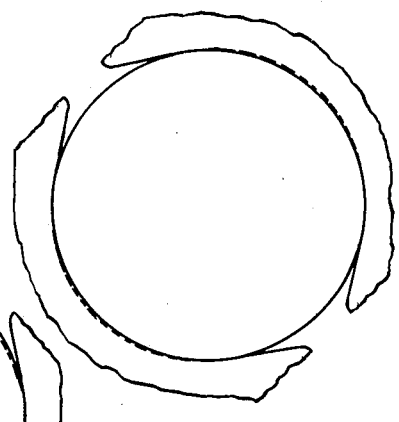
Figure 20:
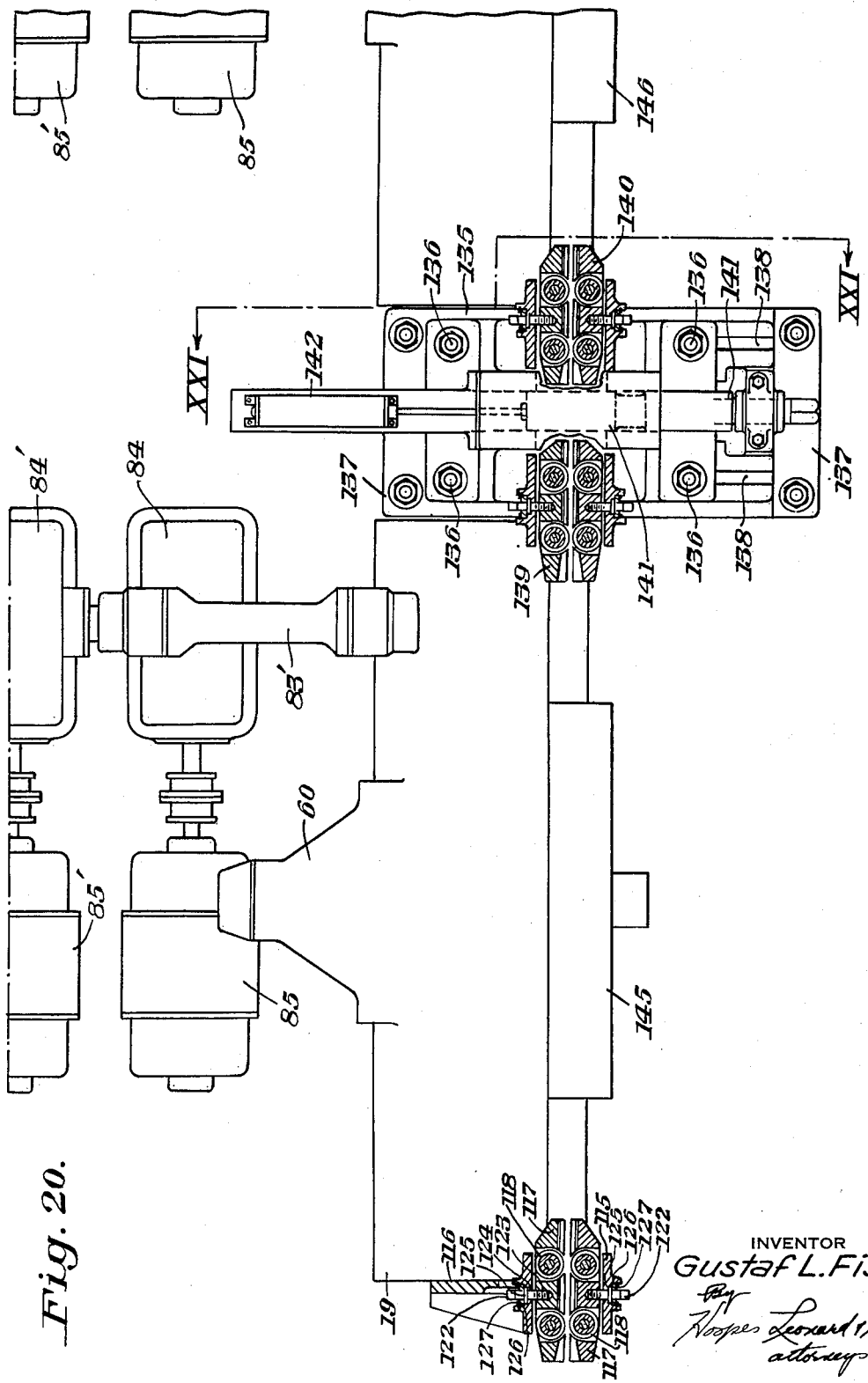
Figure 21:
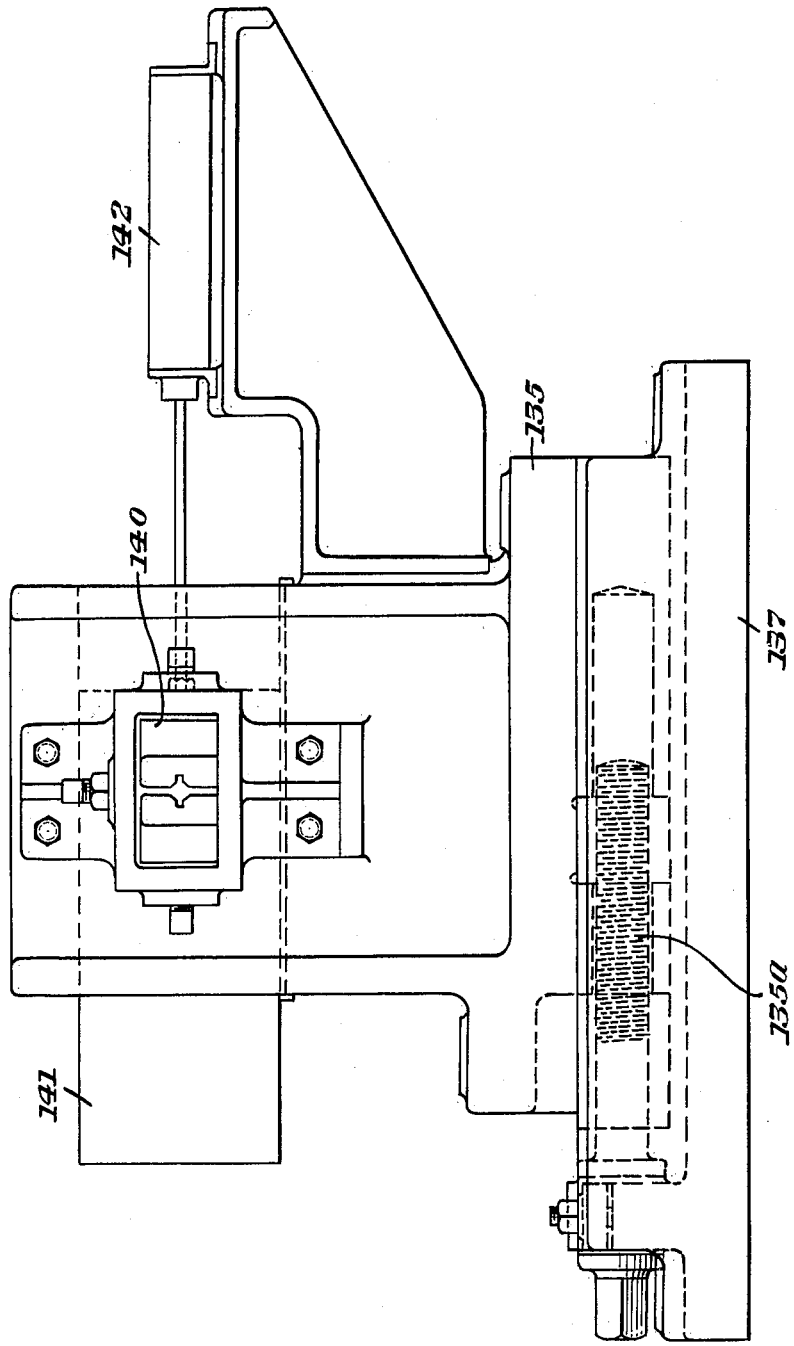
Figure 25:
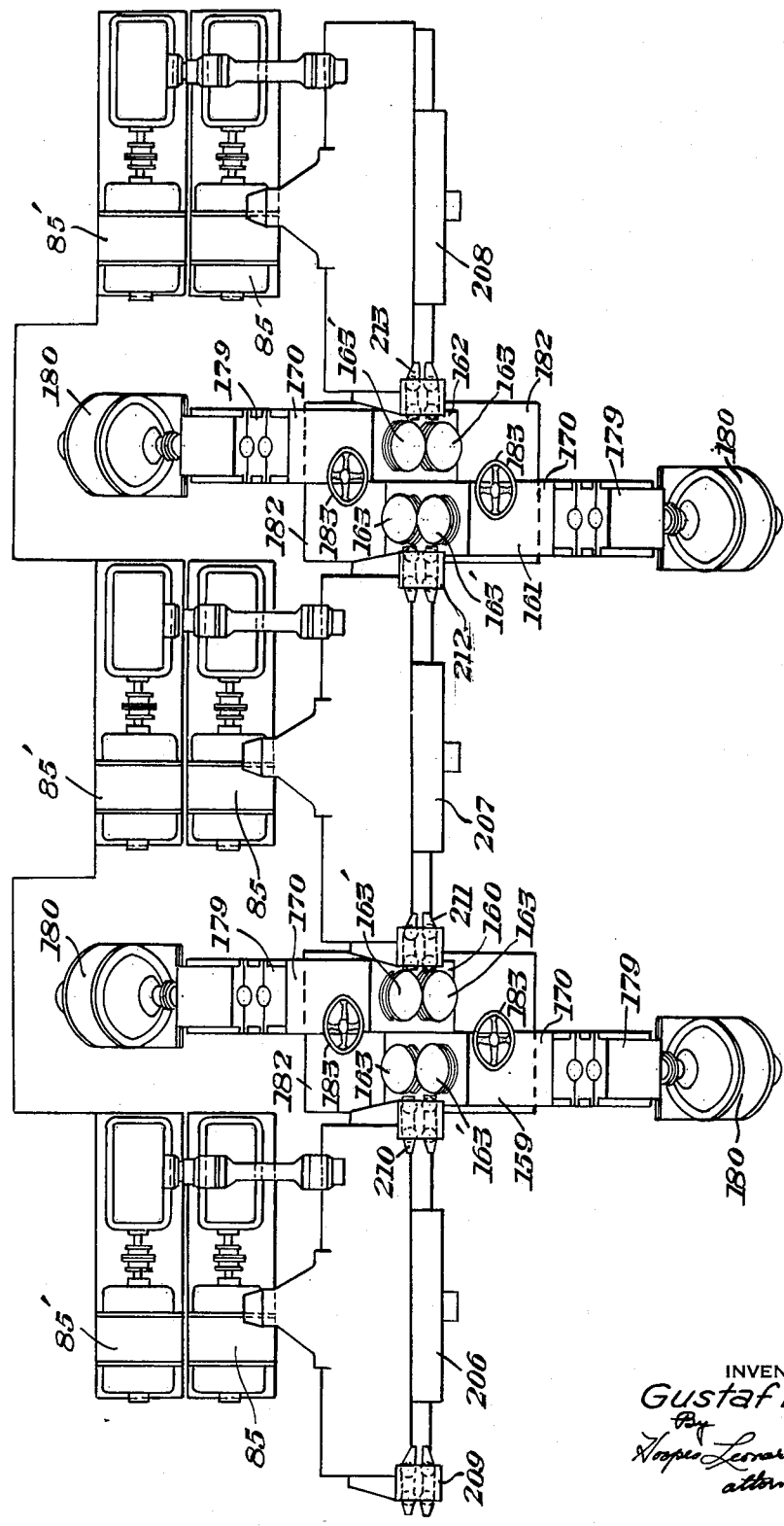
Figure 28:
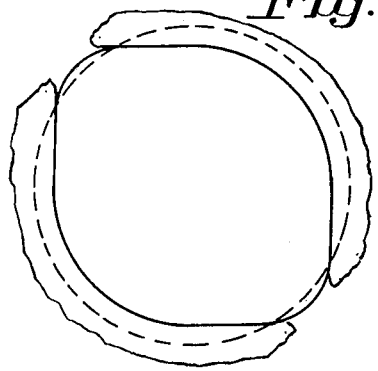
Figure 32:
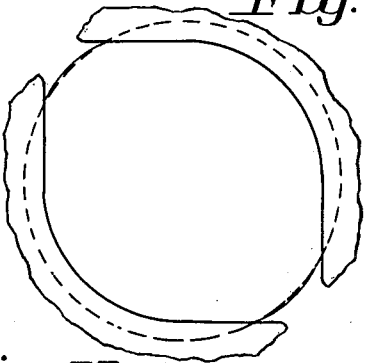
Figure 29:
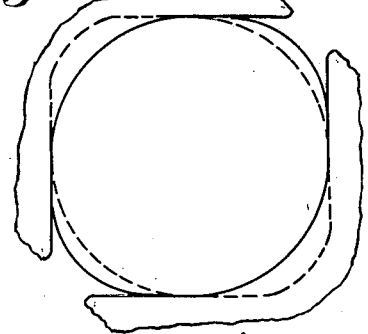
Figure 33:
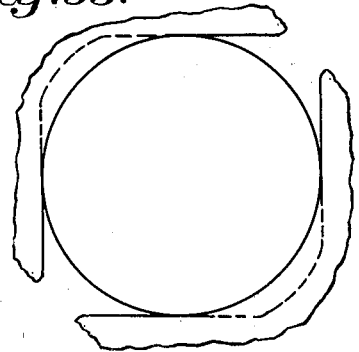

Figures 14 to 18, inclusive, are enlarged fragmentary diagrams illustrating how a bar may be guided in its passage into, through and out of the apparatus;

Figure 19 is a somewhat diagrammatic view partly in elevation and partly in vertical cross section showing use of my flying traction vise in the continuous cold drawing of bars through dies in a draw frame;

Figure 20 is a somewhat diagrammatic view partly in plan and partly in horizontal cross section of the apparatus shown in Figure 19 but with portions cut away for clarity of showing;

Figure 21 is a cross-sectional view taken on the line XXI—XXI of Figure 20;

Figure 22 is a diagrammatic plan view showing a complete layout of equipment for the continuous cold drawing of bars in which my apparatus is employed;

Figure 23 is a vertical transverse cross-sectional view through a two-high rolling mill employing overhung and demountable rolls adapted for the cold rolling of bars;

Figure 24 is an end view taken on the line XXIV—XXIV of the apparatus shown in Figure 23;

Figure 25 is a plan layout showing apparatus for the cold rolling of bars employing my apparatus;

Figure 26 is an elevational layout of the apparatus shown in Figure 25;

Figure 27 is a diagrammatic plan view showing a complete layout of equipment for the cold sizing of bars in idler rolls in which my apparatus is employed;

Figures 28 to 31, inclusive, are large scale representations of successive roll passes showing the reductions which may be obtained in the roll stands of the mill layout of Figures 25 and 26 when the bars are cold rolled without tension;

Figures 32 to 35, inclusive, show the same roll passes as are shown in Figures 28 to 31, inclusive, but with the bars being cold rolled under tension; and Figures 36 to 38, inclusive, are large scale representations of successive roll passes showing the reductions which may be obtained in the roll passes of the mill layout of Figure 27 when employed for the cold sizing of bars in idler rolls.

Referring now more particularly to the drawings, and referring first to Figures 1, 2, 3 and 5, I have shown two opposed cooperating endless chains 1 and 1' trained over driving sprockets 2 and 2' and idler sprockets 3 and 3' respectively. Disposed about the chains 1 and 1' respectively are belts 4 and 4' which by force exerted through the chains, as will presently be described, can be brought in powerful gripping contact with bars 5 which are advanced through the apparatus from left to right viewing Figure 1. The belts establish powerful traction on the bars by friction and maintain the longitudinal axis of the bar in the fixed pass line of the apparatus.

In the space between the driving sprockets 2, 2' on the one hand and the idler sprockets 3, 3' on the other hand and where the belts 4, 4' have generally parallel reaches opposed to each other the chains 1, 1' are backed up by runways 6 and 6' respectively, each consisting of a series of idler rollers, the rollers of the runways 6 and 6' being journalled in antifriction bearings 7 and 7' respectively and cushioned by rubber sandwiches 8 and 8' on movable girders 9 and 9' respectively. The respective girders 9 and 9' are supported, each adjacent both ends, in bearings on crank shafts 10 and 10' journaled in bearings 11 and 11' of carriers 12 and 12' respectively which are supported by bolts 13 and 13' upon lugs 14 and 14' of bearing boxes 15 and 15' respectively. When not otherwise restrained, as will presently be described, the mass of the girder 9 and the runway 6 and associating mechanism automatically causes the crank shafts 10 to remain in their extreme positions in which girder 9 rests on pad 43 of carrier 12. The corresponding positions of crank shafts 10' and girders 9' with respect to pad 43' of carrier 12' is maintained by spring balance rigs 44 which may be of conventional construction suspended from the carrier 12' and capable of sustaining a load equal to approximately twice that of the mass of girder 9', runway 6' and associated mechanism. The bearing boxes 15, 15' serve to journal shafts 16, 16' of the driving sprockets 2, 2' respectively and shafts 17, 17' of the idler sprockets 3, 3' respectively and are slidably mounted in the windows of main housings 18 and 19 which are bolted to bedplate 20 and housing cap 21 to form the frame of the apparatus.

Between the bearing boxes of each pair of bearing boxes 15, 15' is disposed a screw block 22 which is rigidly secured to the housing 18 or 19 as the case may be by keys 23. Each screw block 22 contains a worm 24 meshing with a worm wheel 25 lying in the horizontal plane of the pass line of the apparatus. Worm wheel 25 has a hub 26 which turns in bearings 27 and 27' disposed within the screw block 22 to revolve nuts 28 and 28' which are keyed to the hub 26 and have threads of opposite hand meshing with the threads of screws 29 and 29' respectively. The projecting ends of screws 29 and 29' are disposed in sockets 30 and 30' of the bearing boxes 15 and 15' respectively and have flanges 31 and 31' respectively which are provided with jaws 32 and 32' respectively interengaging with the respective bearing boxes 15 and 15' to hold the screws against rotation relatively to the bearing boxes. The screws 29, 29' are maintained in contact with the bearing boxes 15, 15' respectively by springs 33, 33' respectively which are preloaded by washers 34, 34' and 35, 35' and bolts 36, 36' to permit the furniture of the housings 18 and 19 to be readily assembled.

The springs 33 are preloaded to more than balance the total weight of the bearing boxes 15 and all parts carried by them, while the springs 33' are preloaded to a lesser degree since they have no corresponding weight to carry. At their respective preloads the spring assemblies 33, 34, 35, 36 and 33', 34', 35', 36' are of suitable height to allow necessary clearance for assembly of furniture in the housings 18 and 19 as will now be described.

The spring assemblies 33, 34, 35, 36 are inserted in receptacles 37 in the bottoms of the housings and the bearing boxes 15 with the respective shafts 16 and 17 therein are lowered through the housing windows to rest on those spring assemblies. The screw blocks 22 are next inserted into the housings, the screws 29, 29' being at such time fully retracted to provide for the minimum overall dimension between each flange 31 and the corresponding flange 31' and also to position the flanges 31, 31' equidistant from the centers of the respective worm wheels 25. The jaws 32, 32' are also at such time positioned for interengagement with the respective bearing boxes 15, 15'. After the screw blocks 22 have been placed in the housings on top of the respective bearing boxes 15 with the lower ends of the screws 29 disposed in the respective sockets 30 and the jaws 32 in interengagement with the bearing boxes 15 the screw blocks are fastened in place in the housings by keys 23. Thereafter the upper bearing boxes 15' with the respective shafts 16' and 17' and the spring assemblies 33', 34', 35', 36' are applied in cooperative relationship with the screws 29' and the cap 21 is put in place and fastened to the respective housings. All parts carried by the bearing boxes 15, 15, some of which have already been referred to, readily lend themselves to subsequent assembly.

Figure 2:
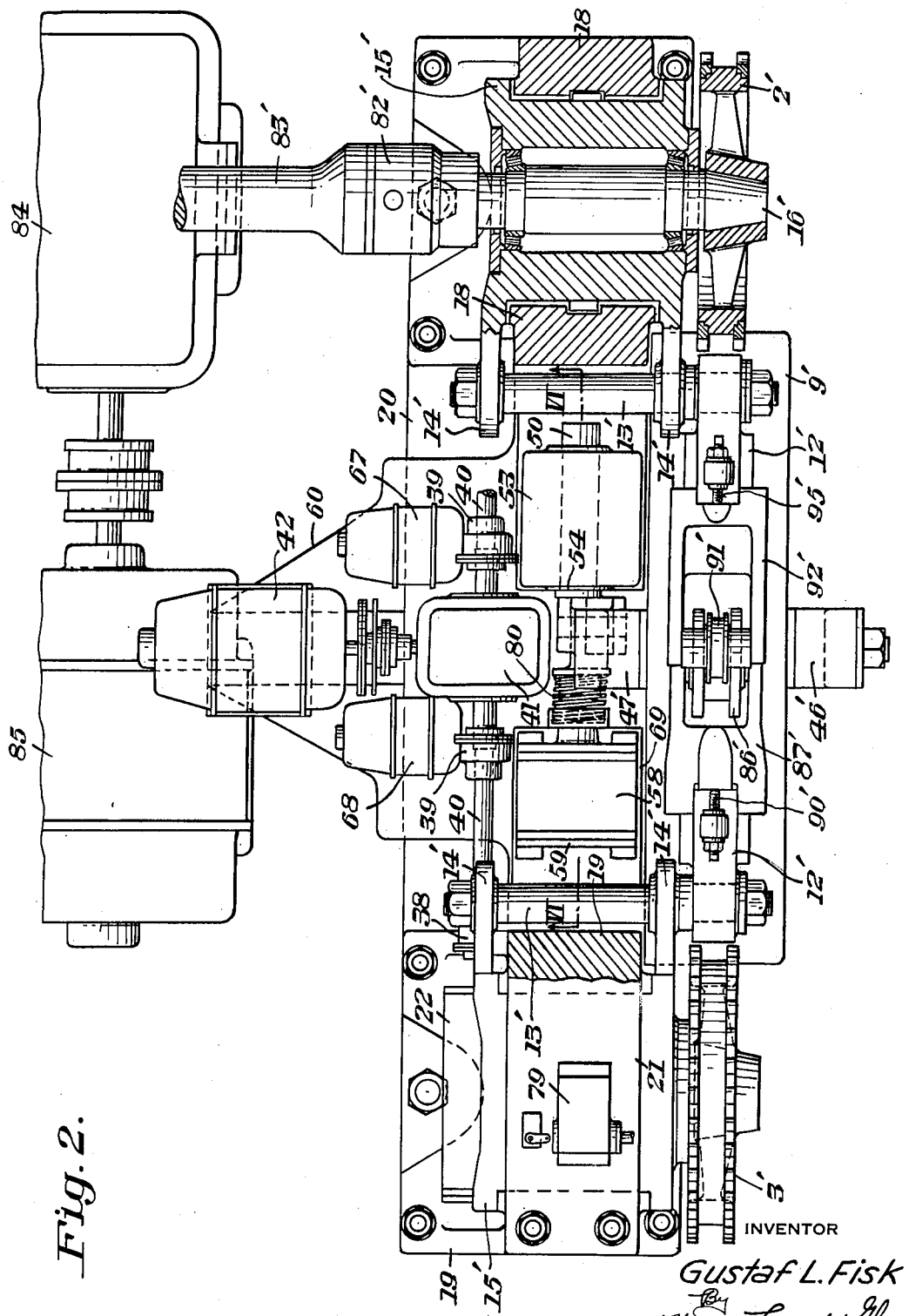
Figure 2 is a view partly in plan and partly in horizontal cross section of the flying traction vise shown in Figure 1.
Figure 3:
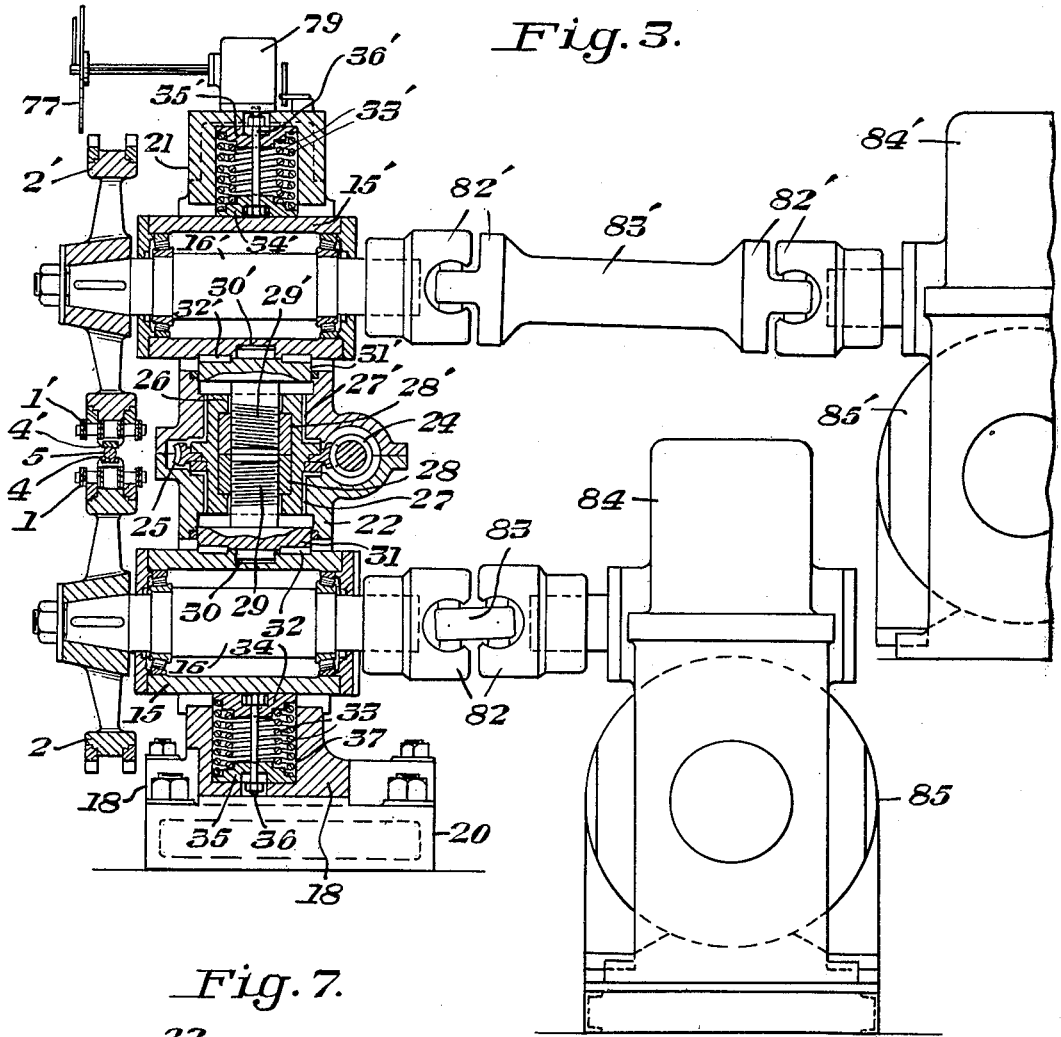
Figure 3 is a vertical transverse cross-sectional view taken on the line III—III of Figure 1.

The worms 24 are connected by couplings 38 and 39 and shafting 40 to a reduction drive 41 for operation by an electric motor 42 (see Figure 2). Rotation of the motor armature in the proper direction operates, through the reduction drive 41, the shafting 40 and the couplings 38 and 39, the worms 24 in unison, the worms in turn rotating the respective worm wheels 25 to turn the nuts 28, 28' carried thereby to cause the screws 29, 29' which are held against rotation by interengagement of the jaws 32, 32' with the respective bearing boxes 15, 15' to move apart or away from each other. In setting up the control mechanism the screws 29, 29' are thus caused to travel away from each other to such an extent as to subject the bearing boxes 15, 15' to the pressure of the respective preloaded springs 33, 33'. This position of the parts corresponds to minimum pass opening and one limit switch setting for motor 42. Continued rotation of the motor armature in the same direction causes further compression of the springs 33, 33' accompanied by separation of the bearing boxes 15, 15' until the bearing boxes 15 come close to the bottoms of the housing windows and the bearing boxes 15' come close to the tops of the housing windows. This position of the parts corresponds to maximum pass opening and the other limit switch setting for motor 42. The limit switches stop rotation of the armature of motor 42 in each direction before damage can be done to the parts.

Throughout the range of positions of the bearing boxes 15, 15' as they are set for different pass openings, the bearing boxes remain equidistant from a horizontal plane through the pass line and consequently so do the parts carried by the bearing boxes including the driving sprockets 2, 2', the idler sprockets 3, 3' and the runways 6, 6'. Thus through operation of the motor 42 the pass opening may be adjusted for bars of different sizes within the range of the apparatus, the pass opening being always centered on the fixed pass line.

The mechanism for gripping a bar 5 in the pass opening will now be explained with reference to Figures 1, 2, 4, 5 and 6. A shaft 45 is journaled in the girder 9 and a shaft 45' is journaled in the girder 9', the shafts 45 and 45' being parallel and with their axes horizontal and in the same vertical plane. The shaft 45 carries adjacent its ends at opposite sides of the girder 9 generally upwardly projecting links 46 and 47 respectively. The shaft 45' carries adjacent its ends at opposite sides of the girder 9' generally downwardly projecting links 46' and 47' respectively. The links 46, 46' are pivoted together by a pin 48. The links 47 and 47' are pivoted together by a pin 49. Also pivoted to the pin 49 is a pusher rod 50 adapted, through mechanism presently to be described, to be moved horizontally in either direction parallel to the pass line whereby to move the girders 9 and 9' toward or away from each other through the links 46, 46' and 47, 47' which together with the pins 48 and 49 form a toggle joint.

The pusher rod 50 is guided at one end in sleeve bearings 51 and 52 in a casting 53. The pusher rod 50 is shaped so as to have a shoulder 54 adapted to engage the casting 53 when the pusher rod 50 moves to the right viewing Figure 6, the casting 53 thus serving as a stop to limit movement of the pusher rod in that direction. When the pusher rod is moved toward the right viewing Figures 1 and 6 it draws the girders 9, 9' toward each other to cause the runways 6, 6' to press the chains 1, 1' and the belts 4, 4' toward each other to grip bars 5 in the pass opening. At its left-hand end viewing Figure 6 the pusher rod 50 is attached to a piston rod 56, the piston rod being threaded into the pusher rod and maintained in desired adjusted axial position by a lock nut 55. The piston rod 56 carries at its left-hand end viewing Figure 6 a piston 57 fitting and operable in an air cylinder 58. The cylinder 58 has a cylinder head 59 which serves as a stop for the piston 57, piston rod 56 and pusher rod 50 when moving toward the left viewing Figure 6. When the piston, piston rod and pusher rod move in that direction they open the toggle and move the girders 9, 9' with the runways 6, 6' carried thereby away from each other to release the grip on the bars in the pass opening.

Referring further to Figure 6, the toggle operating mechanism is mounted on a base plate 60 bolted to the main bedplate 20 of the apparatus. The base plate 60 also furnishes the support for the reduction drive 41 and the motor 42. The casting or stop 53 and the cylinder 58 are each adjustable parallel to the length of the pusher rod 50 whereby to provide for stopping the movement of the pusher rod where desired in each direction of its movement. The adjusted position of the stop 53 determines the magnitude of gripping action on a bar in the pass line. The adjusted position of the cylinder 58 determines, through the position of the cylinder head 59, the extent of movement of the girders 9, 9' away from each other when no bar is being gripped. Adjusting rigs for adjusting the positions of the stop 53 and the cylinder 58 on the base plate 60 are mounted in the base plate. Each of those adjusting rigs comprises a screw 61 journaled in bearings 62 and 63. A nut 64 is mounted to travel along each screw 61 when the screw is turned. Keyed to each screw 61 is a worm wheel 65 adapted for rotation in either direction by a worm 66. The right-hand worm 66 viewing Figure 6, i. e., that which cooperates with the stop 53, is driven by a motor 67 bolted to the base plate 60 and the left-hand worm 66, i. e., that which cooperates with the cylinder 58, is driven by a motor 68 bolted to the base plate (see Figure 2). The cylinder 58 is bolted to a base 69. The base 69, which carries the cylinder 58, and the casting or stop 53 are each mounted for movement on ways 70 of the base plate 60 (see Figures 5 and 6). The base 69 has a recess receiving the left-hand square nut 64 viewing Figure 6 and the stop 53 has a similar recess receiving the right-hand square nut 64. The respective square nuts 64 are held against rotation in the recesses so when either of the screws 61 is turned the square nut 64 threaded thereto must partake of translatory movement parallel to the axis of the screw and such translatory movement is accompanied by corresponding translatory movement of the stop 53 or cylinder 58 as the case may be. Thus the positions of the stop 53 and the cylinder 58 are adjusted by operation of the motors 67 and 68 respectively.

Figure 1:
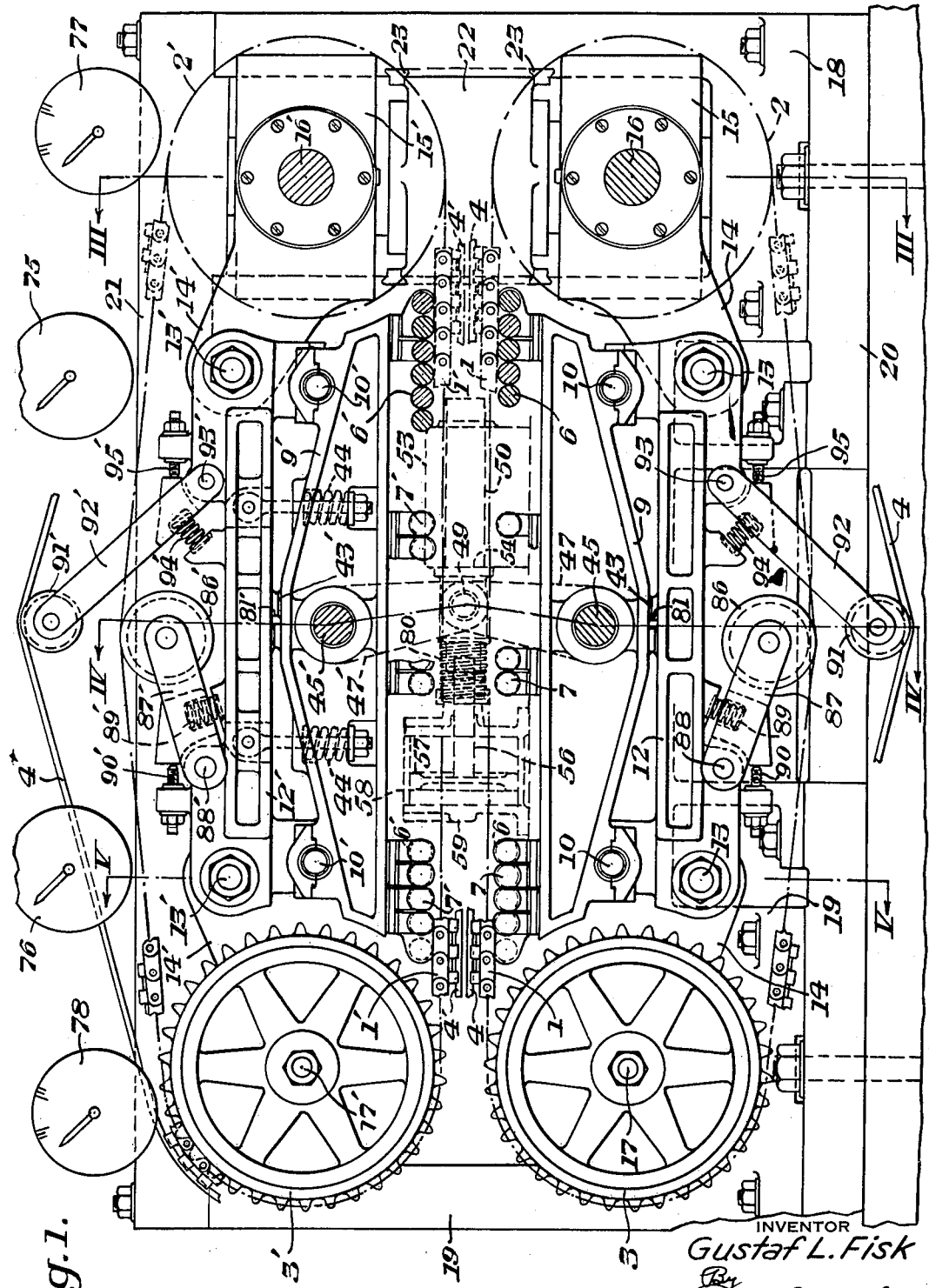
Figure 7:
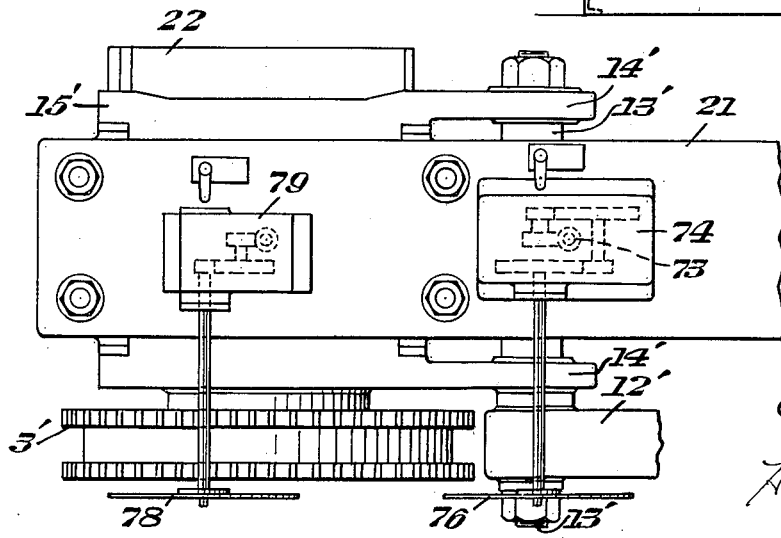
Figure 7 is a fragmentary plan view showing a portion of the apparatus.

Keyed to each of the screws 61 is a miter gear 71 meshing with another miter gear 72 which is connected by shafting 73 to gearing of a drive 74 mounted atop the housing cap 21 (see Figures 1 and 7). There are two similar drives 74 only one of which (that corresponding to the left-hand shafting 73 viewing Figure 6) is shown in Figure 7. The other drive 74 which corresponds to the right-hand shafting 73 viewing Figure 6 operates a hand on an indicator dial 75 (Figure 1) to indicate the position of the stop 53. The drive 74 corresponding to the left-hand shafting 73 viewing Figure 6 operates a hand on an indicator dial 76 (Figure 1) to indicate the position of the cylinder head 59 of the cylinder 58.

Two other dials 77 and 78 are provided on the housing cap 21 to indicate the settings for pass opening at the respective housings 18 and 19. The hands operating on the dials 77 and 78 are operated each through a drive 79 actuated by one of the bolts 36' as it moves up or down during adjustment of the pass opening. The hands operating on the dials 77 and 78 also serve by comparison of their positions to indicate any difference in pass opening at the respective housings. The pass openings should be the same. Any discrepancy can be obviated by adjustment of the couplings 38 or 39.

The motions of stop 53 by motor 67 and cylinder 58 by motor 68 are restricted by limit switches to cover a range corresponding to requirements for the sizes of bars to be accommodated in the apparatus. The controls for those motions are electrically interlocked with the control for motor 42 to prevent that motor from operating to adjust the pass opening unless the stop 53 is at the extreme position for minimum bar size and the cylinder 58 is at the extreme position for maximum bar size. When the stop 53 is at the extreme position for minimum bar size and the cylinder 58 is at the extreme position for maximum bar size the pusher rod 50 is free to slide in the sleeve bearings 51 and 52 to accommodate the movements of the crank arms 47, 47' during adjustment for pass opening. When the pass opening is being increased the spring balance rigs 44 and the weight of girder 9, runway 6 and associated parts are calculated to overcome the friction of the toggle mechanism and the resistance of spring 80 (see Figure 6) so that the girders 9, 9' remain in contact with the pads 43, 43' on the carriers 12, 12' during all adjustments for pass opening. Should there be any tendency of the girders 9, 9' to lose contact with the pads 43, 43' by turning of the crank shafts 10, 10' such tendency would be arrested by stops 81, 81' on the carriers 12, 12' which serve to limit the turning movement of the crank shafts 10, 10' to the movement required for operation of the apparatus. The above mentioned spring 80 urges the pusher rod 50 toward the right viewing Figure 6 and is for the purpose of braking the toggle when the crank arms 47, 47' reach a nearly vertical position during adjustments for pass opening.

After the apparatus has been set for required pass opening by operation of motor 42 it can be set for desired traction which is governed by the gripping force applied to the bars. To set the gripping mechanism the motor 67 is operated until the hand of dial 75 points to a reading representing the size of the bar less a figure denoting the calculated compression of the rubber sandwiches 8, 8' to produce the required gripping force. The gripping position of stop 53 then determines the limit of motion for pusher rod 50 in closing the toggle to grip the bar. The motor 68 is next operated until the hand of dial 76 points to a reading representing the size of the bar, which reading should check with the readings of the hands of dials 77 and 78 for pass opening. The corresponding position of the cylinder head 59 then determines the limit of motion of the pusher rod 50 in opening the toggle to release the bar. Low pressure air is next admitted to cylinder 58 to force the piston 57 against the cylinder head 59 in the event that for any reason the spring balance rigs 44 and the weight of girder 9, runway 6 and associated parts may have failed to move the pusher rod 50 to its exact stopping position during the setting for pass opening by motor 42. The gripping mechanism is then ready for operation on the size of bar for which the machine has been set. The bars are advanced by the belts 4, 4' in a manner to be explained.

I shall now explain how my apparatus operates to grip and release bars disposed in the pass opening thereof. Referring to Figure 6, high pressure air is admitted to cylinder 58 between cylinder head 59 and piston 57 which moves the pusher rod 50 toward the right until its shoulder 54 engages the stop 53. Such movement of the pusher rod 50 causes pins 48 and 49 cooperatively to move links 46, 46' and 47, 47' to draw shafts 45 and 45' toward each other, thereby moving girders 9 and 9' and runways 6 and 6' carried by the girders toward each other. The girders serve as the jaws of a vise actuated by the toggle joint. As the girders move toward each other they move also generally toward the right viewing Figure 1 due to the action of the crank shafts 10 and 10'. The toggle links 46, 46' and 47, 47' exert a pull on the shafts 45 and 45' which has a component directed toward the right viewing Figure 1 so that the toggle action cooperates with the action of the crank shafts in moving the girders both toward each other and also toward the right. Crank shafts 10, 10' necessarily turn when the toggle is operated to grip or release bars. The crank shafts 10, 10' maintain the girders 9, 9' in parallelism with each other and with the pass line at all times. When a bar occupies the pass opening the movement of the girders 9 and 9' toward each other causes the belts 4, 4' to grip the bar and also causes compression of the rubber sandwiches 8, 8' to the extent permitted by the setting of the stop 53. The gripping force is maintained on the bar until the high pressure air in the cylinder 58 between the cylinder head 59 and the piston 57 is released.

To free the bar from the grip of the vise the high pressure air in the cylinder 58 between the cylinder head 59 and the piston 57 is released and the low pressure air on the opposite side of the piston causes reversal of the movement of the parts and return of the piston 57 to its position of rest against the cylinder head 59. The low pressure air to the right of the piston 57 viewing Figure 6 serves to overcome the friction of the moving parts and the resistance of the spring 80 and to give a snappy action to the apparatus when releasing the bar.

Thus a stroke of piston 57 in one direction brings about gripping of the bar, a stroke of piston 57 in the opposite direction releases the bar and when the bar is being gripped the sandwiches 8, 8' are under compression while upon release of the bar the pressure on the sandwiches is relieved. The opening and closing of the vise can be repeated indefinitely and at will. The adjustments for traction are independent of the adjustments for pass opening and are accomplished by two motors. The movements of all adjusting rigs are made with respect to and maintain a fixed pass line. The gripping forces applied to the bars are balanced within the toggle operated vise and impart no loads to the main frame of the apparatus except those incidental to the maintenance of parallelism of girders 9, 9' by crank shafts 10 and 10'.

The bars are moved through the apparatus by the endless belts 4, 4' which are supported by the endless chains 1, 1' trained over the driving sprockets 2, 2' and idler sprockets 3, 3'. The shafts 16, 16' of the driving sprockets 2, 2' are connected by flexible couplings 82, 82' and spindles 83, 83' to reduction drives 84, 84' and motors 85, 85' (see Figures 3 and 2). Thus the motors serve to move the chains 1, 1' with the belts 4, 4' on the runways 6, 6' and furnish the power for the tractive effort of the flying traction vise on the bars when they are gripped by the moving belts through operation of the mechanism above described.

The chains 1, 1' are maintained under proper tension by take-up sprockets 86, 86' carried by arms 87, 87' pivoted at 88, 88' to the respective carriers 12, 12' and biased by springs 89, 89'. Outward movement of the arms 87, 87' is limited by adjustable stop screws 90, 90'. Similarly the belts 4, 4' are maintained at proper tension by take-up pulleys 91, 91' carried by arms 92, 92' pivoted at 93, 93' to the respective carriers 12, 12' and biased by springs 94, 94'. Outward movement of the arms 92, 92' is limited by adjustable stop screws 95, 95'. Since the chain and belt tighteners are mounted on the carriers 12 and 12' they move with the sprockets 2, 2' and 3, 3' so that the tightness of the belts and chains is not affected by adjustments of pass opening and traction.

The chains 1 and 1' are duplicates of each other. One of those chains is shown in detail in Figures 8, 9 and 10. The chain is a double chain with outside links 96 of more or less conventional form and special inside links 97. The inside links 97 carry blocks 98 and side guards 99 to support and guide the belts 4, 4'. Pins 100 pass through the outside and inside links, each pin 100 having a roller 102 disposed thereabout between each outside link and the corresponding inside link. The rollers 102 are adapted to engage the teeth of the sprockets 2 and 2' and 3, 3' both of which are double sprockets having parallel spaced apart series of teeth. Likewise the take-up sprockets 86, 86' are double sprockets having parallel spaced apart series of teeth with which the double chain meshes. The chain links 96 and 97, pins 100 and rollers 102 are maintained in assembly by nuts 103 and lock washers 104. The blocks 98 of the special inside links 97 form a continuous support for the belts 4, 4' except for small clearances 105 between successive blocks of the assembled chain.

The clearances 105 provide for a limited deviation of the chain links in the vertical direction from their normal paths of travel on runways 6, 6' in the event that a bar 5 should inadvertently travel through the apparatus while the traction vise is in its closed or gripping position. In such event the end of the bar would progressively compress the sandwiches 8, 8' one by one in each of the two series of such sandwiches and its trailing end would similarly successively relieve the pressures on the individual sandwiches. In either case the individual sandwiches, when thus acted on by the ends of the bar, would tend to move adjacent chain links from contact with the runways 6, 6' and cause the very edges at the ends of the bar to cut into the belts 4, 4'. This is because all the work of compressing and releasing the sandwiches is performed by the particular chain links supporting the ends of the bar. It is the purpose of the limited clearances 105 to minimize such detrimental action so far as is possible without danger of damage to the chains. In other words, the clearances 105 are calculated to accomplish the compression and release of the sandwiches relatively gradually and thus save the belts from serious damage. Ordinarily a bar will not be admitted to the pass opening of the traction vise unless the bar gripping mechanism is in released position as will presently be explained.

Figures 11, 12 and 13 show details of the runway 6 which are duplicated in the runway 6' so that the detailed structure of both runways will be made clear through illustration and description of the runway 6 by way of example. The runway 6 comprises idler rollers 106 and 107 which are spaced on centers slightly less than the pitch of the sprocket chain 1 which rides on the runway 6. This slight difference in pitch is to insure smoothness of travel of the chain over the rollers 106 and 107. The rollers 107 have flanges 108 at their ends and alternate with rollers 106 which are unflanged and necked in adjacent their ends as shown in Figure 11 to provide space for the flanges 108. The purpose of the flanges 108 is to serve as side guides for the chain 1 and maintain it centered on the rollers 106 and 107. The antifriction bearings 7 have journals 109 in which the shafts of the rollers 106 and 107 are rotatively supported. Each sandwich 8 supports two of the bearings 7. Each sandwich 8 consists of a cushion 111 of rubber or rubber-like material bonded to steel plates 112 and 113 by vulcanizing. The sandwiches 8 are fastened to the girders 9 by bolts 114 passing through laterally projecting portions of the plates 113 as shown in Figure 12. The bearings 7 are fastened to the respective sandwiches by bolts 110 passing through laterally projecting portions of the plates 112 as shown in Figure 12.

I prefer to employ numerous small sandwiches in preference to a smaller number of longer sandwiches and to mount a limited number, preferably two, of the bearings 7 on each sandwich to prevent overloading of rollers 106 and 107 or damage to the belt 4. I have already referred to the ends of a bar possibly traveling through the apparatus when set for compression of the rubber sandwiches to grip the bar. The ends of the traveling bar would progressively compress and release the sandwiches as explained. The greater the area of rubber in the sandwich subject to compression the greater will be the individual loads imposed on the rollers 106 and 107 and on the belt 4 at the ends of the bar; hence minimizing the sandwich areas minimizes such individual loads.

Figure 14:
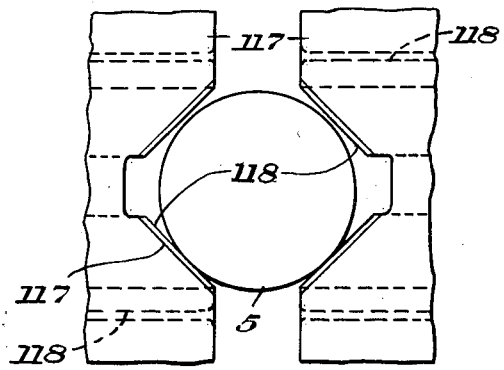

The means employed to guide the bars into the pass opening of my traction apparatus are shown in Figures 14, 19 and 20 and comprise a guide box 115 having a bracket 116 bolted to the housing 19 and guides 117 having guide rollers 118 journaled in antifriction bearings. The guides 117 are recessed for sliding fit on a guideway 119 in the guide box 115 and on a key 120. To assemble the guiding mechanism the guides 117 are fitted with the key 120 and pushed into the box 115 for engagement with the guideway 119, causing the guides 117 to come to rest at either end on aprons 121 of the guide box 115. When the guides are so positioned all of the bar guiding surfaces are automatically properly positioned in relation to the pass opening insofar as their elevation is concerned and irrespective of the size of the bar to be accommodated. Sidewise adjustment of the guides 117 to the required pass opening is accomplished by screws 122 meshing with threads 123 in the guides 117, the screws passing through holes 124 in the guide box 115. The screws 122 have flanges 125 and are mounted for rotation in fixed positions in the guide box 115 by washers 126 and snap rings 127. Turning of the screws 122 moves the individual guides 117 so that they may be set for the desired pass opening. When the guides have been set as desired a set screw 128 on top of the guide box 115 is tightened against key 120 and locked by lock nut 129 whereby to hold the guides in place. The setting of the guides may be adjusted by loosening the nut 129 with the set screw 128 which permits the screws 122 to be turned to move the guides 117 in or out. The smallest pass opening in the guides is determined by the guide rollers 118 which contact the bar, leaving a small clearance between the guiding surfaces of the guides 117 and the bar (see Figure 14).

Figure 15:
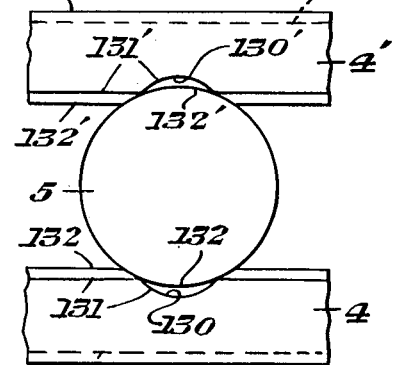
Figure 16:
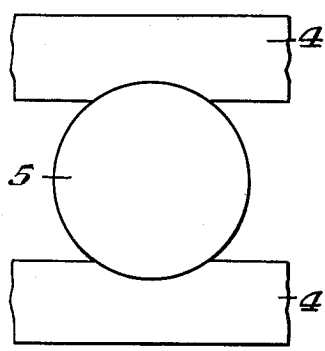
Figure 17:
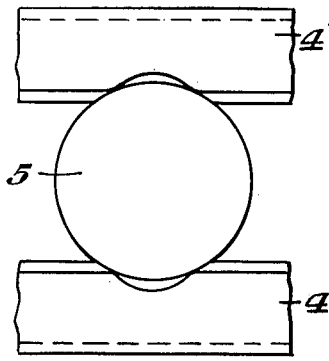

The guiding of bars through the apparatus will now be described with reference to Figures 15, 16 and 17. The belts 4, 4' shown in partial cross section in these figures are grooved as shown at 130 and 130' to fit a smaller bar than the bars to be guided so that in the case illustrated the radius of each of grooves 130 and 130' is less than one-half the diameter of the bar 5. In setting the pass opening as above described the pass opening is adjusted to fit the bar at maximum clearance between the belts 4 and 4' at the bottoms of their respective grooves 130 and 130'. As the forward end of the bar 5 passes through the guides 117 to the pass opening between the idler sprockets 3, 3' it is gripped by the moving belts 4, 4'. These belts are preferably made of neoprene or other oil-resisting rubber or rubber-like material and duly reinforced. To make room for the advancing bar in the pass opening between the sprockets the sides of the belt grooves 130, 130' are displaced so as alternately to assume the shapes indicated by lines 131, 131' and 132, 132' as shown in Figure 15. This is due to the action of the belt supporting chain links on the sprockets, i. e., to the difference between circle pitch and chordal pitch of the idler sprockets 3, 3'. The corresponding limits for up-and-down movements of the belts 4, 4' are indicated by lines 133, 133' and 134, 134' in Figure 15.

The displacement of rubber along the sides of the grooves 130, 130' causes the bar to be firmly held in the grooves for guidance through the apparatus. The displacement of the rubber during passage of the bar between the runways 6 and 6' is shown in Figure 16. Figure 17 shows the fluctuating displacements when the bar travels in the pass opening between the driving sprockets 2, 2' which are identical with those encountered between the idler sprockets 3, 3' as shown in Figure 15.

Figure 18:
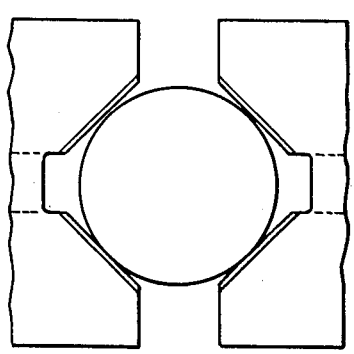

Figure 18 shows delivery guides for the machine similar to the entry guides shown in Figure 14 and which may also serve to assist in guiding the bar into a machine for cold reduction of its section area. See also Figures 19 and 20.

Thus I have provided for dependable guiding of bars through my traction apparatus, the guiding of the bars from the point of entry between the idler sprockets to the point of delivery between the driving sprockets being accomplished by the belts of the traction apparatus without the aid of other special equipment.

One use to which my flying traction vise may be put may be illustrated by reference to Figures 19, 20 and 21 which show two of the vises employed in connection with die means in the continuous cold drawing of bars. One of the flying traction vises is designated generally by reference numeral 145 and is disposed at the entrance end of the die means while the other is designated generally by reference numeral 146 and is disposed at the exit end of the die means.

The die means of Figures 19, 20 and 21 comprises a draw frame 135 mounted on a fixed base 137 for transverse adjustment by means of an adjusting rig 135a. The draw frame 135 has holes 136 for bolts by which it is secured to the base 137, the base having bolt receiving slots 138. When the bolts are loosened the draw frame 135 may be adjusted by the adjusting rig 135a and may also be moved transversely of the pass line to clear the belts, chains and sprocket wheels of the traction apparatus for changing of guides 139 and 140. In the draw frame 135 is fitted a slide 141 for operation by the piston of an air cylinder 142. In the slide 141 are mounted two die holders 143 each having a die 144 therein. The die holders 143 and dies 144 are so positioned in the slide 141 that when the piston of the cylinder 142 is at one end of its stroke one of the dies will be in the pass line and when the piston is at the opposite end of its stroke the other die will be in the pass line. Thus by movement of the piston in the cylinder 142 the dies 144 can be alternately positioned in the pass line. The purpose of alternating the dies 144 is to provide time intervals for heat dissipation in the cold drawing process and thus prevent overheating of the dies. The mountings for the guides 139 and 140 and their adjustments for the pass opening will be understood in relation to means which I have already described to guide the bars into the pass opening of the flying traction vise.

As will be clear from the above description, I propose for the cold drawing of bars to provide the draw frame 135 containing the two alternately operable dies 144 and two flying traction vises all located to provide a common fixed straight pass line. The flying traction vise 145 serves to push the front ends of the bars through the respective dies 144 to position for gripping engagement by the other flying traction vise 146 which serves to pull the remaining portions of the bars through the dies.

The operation of my flying traction vise and drawing means will now be explained in connection with the continuous cold drawing of bars. The bars may be drawn to reduce their section or for sizing. Prior to drawing the bars should be annealed, desirably by the economical process of pack annealing the hot-rolled product on the hot mill cooling bed. The bars should also be pickled before the cold drawing operation to avoid undue wear of the dies and give the cold drawn product a clean surface and desirable luster.

Figure 22 shows a layout for cold drawing bars which comprises a bed 147 for hot-rolled pack annealed and pickled bars, a run-in table 148 to feed the bars to flying traction vise 145, draw frame 135 with two dies therein, flying traction vise 146, draw frame 146a with two dies therein, flying traction vise 146b, run-out table 149, transfer bed 150, run-in table 151, cold saw 152, run-out table 153 and bed 154. In the description to follow it will be understood that the bars are by the flying traction vise 145 pushed into the dies in the draw frame 135 and by the flying traction vise 146 pulled through those dies and pushed through the dies in the draw frame 146a whence the bars are pulled out by the flying traction vise 146b. As those skilled in the art understand the dies in the draw frame 146a will be of somewhat smaller size than the dies in the draw frame 135 but otherwise the flying traction vises and the drawing apparatus function similarly for the respective drawing operations. Consequently in the description to follow reference will be made to the dies in the draw frame 135 and the operation of that draw frame and it will be understood that the same explanation applies to the dies in the draw frame 146a as the operation of that draw frame.

Two die holders 143 with dies 144 of proper size are inserted in slide 141 of draw frame 135 and compressed air is admitted to one end of cylinder 142. The flying traction vises 145 and 146 are adjusted for respective pass openings and tractive forces in the manner already explained and low pressure air is admitted to their cylinders 58. Having adjusted the guides 117, 139 and 140 to the respective bar sizes the sprocket drives of the flying traction vises 145 and 146 are started by operating their motors 85, 85' and their respective speeds are adjusted to compensate for the elongation of the bars in the dies 144 of the draw frame 135. The same applies with respect to the flying traction vise 146b and the dies of the draw frame 146a.

The bars on bed 147 are fed one by one on to the run-in table 148 for delivery through the guides 117 to engagement with the moving belts 4, 4' of flying traction vise 145 which move and guide the bars through the apparatus. When the forward end of each bar has passed the last rollers of runways 6, 6' of the flying traction vise 145 high pressure air is admitted to cylinder 58 of that vise and the bar is gripped therein and forced through the one of the dies 144 of the draw frame 135 which is positioned in the pass line until the forward end of the bar has passed the last rollers of the runways 6, 6' of the flying traction vise 146. At that time high pressure air is admitted to the cylinder 58 of flying traction vise 146 causing it to grip and advance the bar. At this point the grip of flying traction vise 145 is preferably released and flying traction vise 146 pulls the rear end of the bar through the die 144, feeds it through one of the dies in the draw frame 146a, the operations just described being repeated in that die and by the flying traction vise 146b. Each flying traction vise releases its grip on the bar before the trailing end of the bar reaches the first rollers of the runways 6, 6' thereof. The cold drawn bar is delivered by the flying traction vise 146b to the run-out table 149 for further handling and operations by machinery already referred to.

Successive bars follow one another so closely that a bar may be entering a flying traction vise before the preceding bar has left the same flying traction vise, leaving only enough time between bars for operation of the air cylinders to alternate the dies in the draw frames 135 and 146a.

The valves for the air cylinders 58 of the flying traction vises and the air cylinders for moving the dies of the draw frames should preferably be solenoid operated and may be controlled by electric eyes, the beams of which are broken or restored by the passage of the bars so as to make the operation automatic. The operations described result in what amounts virtually to a continuous process of cold drawing although the leading end of each bar is spaced a short distance behind the trailing end of the preceding bar, that distance being sufficient for rapid, almost instantaneous, operation of the slides in the draw frames to move one die out of the pass line and the other die into the pass line. Thus to all intents and purposes the process is continuous with change of dies between successive bars. The change of dies makes possible sustained continuous operation by affording each die cooling time between drawing operations therein.

Figures 23, 24, 25 and 26 illustrate the use of my flying traction vises in the cold reduction of bars by rolls. There are shown in Figures 25 and 26 four roll stands 159, 160, 161 and 162 of the type having the rolls mounted on ends of the roll shafts which project from the housings, the roll shafts being inclined and those of alternate roll stands being inclined in opposite directions. The roll stands 159 and 160 are arranged close together for sequential operation as are the roll stands 161 and 162.

Referring now more particularly to Figures 23 and 24 wherein I have shown one of the roll stands 159, 160, 161 and 162, the general mounting and operating structure is conventional so will not be described in minute detail. Rolls 163 and 163' cooperate to form a roll pass 164 through which the bars move. The rolls 163 and 163' have tapered fits 165 and 165' on drive shafts 166 and 166' and have jaws 167 and 167' for engagement with corresponding jaws 168 and 168' of sleeves 169 and 169'. These sleeves are keyed against rotation on the shafts 166, 166' so that the jaws 168 and 168' by which they are coupled to the jaws 167 and 167' of the rolls 163, 163' serve to prevent any turning movement of the rolls on the tapered fits 165, 165'. The rolls 163, 163' overhang the housing 170 on the shafts 166, 166' which are journaled in bearings 171, 171' and 172, 172' of eccentrics 173, 173' which are mounted for rotation in the housing 170. The shafts 166, 166' are connected by flexible couplings 174, 174' to universal spindles 175, 175' which are in turn connected by flexible couplings 176, 176' to hollow shafts 177, 177' of pinions 178, 178'. The housing 170 is split lengthwise along the pinion centers to permit assembly of its furniture. The teeth of pinions 178 and 178' are in meshing engagement and those of pinion 178' also mesh with the teeth of a driving gear 179 carried on top of the housing 170 and operated by a motor 180. Thus the motor 180, through the mechanism described, drives the rolls 163, 163'. The motor 180 is supported on a bracket 181 bolted to the housing 170 and the latter is bolted to a bedplate 182 which serves to support two adjoining roll stands such as that just described, each mounted on a slope of 45° to have a common and fixed pass line with the axes of the rolls of one stand disposed at an angle of 90° to the axes of the rolls of the other stand.

Adjustments of the rolls 163, 163' for roll wear and pass opening are made by handwheel 183 (see Figures 25 and 26) which serves to revolve a worm (not shown) engaging the gearing teeth 184' of eccentric 173'. The teeth 184' also mesh with the teeth 184 of eccentric 173 so that any turning of handwheel 183 causes both of the eccentrics 173 and 173' to turn uniformly and move the rolls equal distances to or from the fixed pass line. Adjustment of the drive shaft 166' in lengthwise direction to match the grooves 185 and 185' in the rolls is accomplished by pin 186 with eccentric 187, strap 188 and flange 189 held in place by washer 190 bolted to the housing 170. The strap 188 contacts flanges 191 and 192 of eccentric 173' and desired adjustment of roll 163' to match grooves 185 and 185' is obtained by turning the pin 186 which has a square end 193 for this purpose. The pin 186 has thread 194 and lock nut 195 to hold it securely in adjusted position.

The sleeves 169, 169' are held in position on the shafts 166, 166' by keys 196, 196' and when so required are adapted to fit bearings 197 and 197'. The bearing 197 is carried in a block 198 mounted for sliding movement in guides 199 of a yoke 200 in which the bearing 197' is mounted. A cap 201 is secured to yoke 200 by bolts 202 and has a set screw 203 with lock nut 204. When free of the drive shafts 166, 166' the yoke assembly, including the sleeves 169, 169', can be adjusted to fit any roll center distance by adjustment of set screw 203 due to the action of springs 205 which are provided to facilitate the exchange of the complete yoke assembly for the sleeves 169, 169'. The utility of my novel yoke assembly will presently be explained.

Referring now to Figures 25 and 26, the layout includes in addition to the roll stands 159, 160, 161 and 162 flying traction vises 206, 207 and 208 and guide assemblies 209, 210, 211, 212 and 213, all of the construction heretofore explained. There is thus formed a continuous mill in which the motors 85, 85' of the flying traction vises and the motors 180 of the roll stands jointly contribute the power required for the bar reductions. Consequently each motor must be individually controlled as to its speed so as to compensate for the reductions in the several sets of rolls 163, 163' and also to maintain tension on the bars as explained in my said copending application Serial No. 624,344.

Figures 28, 29, 30 and 31 and Figures 32, 33, 34 and 35 show respectively the reductions for the leading end of the bar and the reductions for the remainder of the bar when cold rolling a bar in four passes. As an example, the rolling of a 1½" round bar to a finished diameter of 1¼" will be considered. The leading end of the bar is forced through the passes of roll stands 159 and 160 by flying traction vise 206 and through the passes of stands 161 and 162 by flying traction vise 207 without benefit of bar tension. This will cause a normal spread of the bar calculated to increase its size in the parting between the rolls to 1.597" and 1.436" respectively in stands 159 and 160, the passes of which have a diameter of 1.3125" to points of tangency for the sides of the pass. These sides are sloped 45° with respect to the longitudinal center lines of the rolls (see Figures 28 and 29). Similarly it is calculated that the bar will spread to 1.383" and 1.305" respectively in the stands 161 and 162, the passes of which are designed for a diameter of 1.250" (see Figures 30 and 31).

As soon as the leading end of a bar is gripped by flying traction vise 208 the tension established on the bar due to the relative speeds of flying traction vises 206, 207 and 208 will cause practically all the material displaced in the roll passes to flow in the direction of tension. The spread into the roll partings will then be practically eliminated and the roll passes will deliver close to 1.3125" diameter from stand 160 and 1.250" diameter from stand 162 for the remainder of the bar (see Figures 32, 33, 34 and 35).

In the cold rolling of bars the use of lubricant between the rolls and the bars is desirable to retard the hardening of the bar metal and to reduce the power required for its reduction. Such lubrication of the bars may cause the rolls to lose their traction if the angle of roll contact, termed bite angle, exceeds 6° as compared to 30° in the case of hot rolling. Thus the use of relatively large diameter rolls as compared to the rolls used in hot mill practice is indicated in order that the power of the motors which drive the rolls may effectively be utilized for bar deformation. Relatively large diameter rolls are also indicated to enable the traction apparatus to force the bars through the roll passes which may be designed for reductions far in excess of those obtainable applying a bite angle of 6°. However, the use of large diameter rolls and the attendant relatively great contact areas between the rolls and the bars result in very heavy loads on the rolls. The situation is further aggravated when rolling without benefit of tension which causes rapid hardening of the metal at the leading ends of the bars and imposes added loads on the rolls.

In a mill with overhung rolls such as I prefer to employ the possible roll diameter is limited by the bending stresses in the roll supporting drive shafts. The yoke 200 is for the purpose of counteracting such bending stresses. To demonstrate use of the yoke 200, let it be assumed that the rolls 163, 163' of a roll stand have been adjusted for a bar reduction corresponding to a load on the rolls in excess of the normal load carrying capacity of the drive shafts 166, 166'. The yoke 200 with its associated mechanism is then fitted on to the shafts 166, 166' as described above. The set screw 203 is adjusted and locked by nut 204 to provide a predetermined gap, as measured by gauge, between the bearing block 198 and the screw 203. The gap is calculated to cause the bearings 171, 171' alone to take a load up to one-half or more of their capacity, whereafter the additional load imposed on the rolls is divided between bearings 171, 171' on one side and bearings 197, 197' on the other side, for loadings up to the respective bearing capacities. If the springs 205 are strong enough to balance the loads of the drive shaft 166', the roll 163' and the yoke 200 and to take up the clearances in the bearings 171, 171', 172, 172', 197 and 197' then the gap between the block 198 and screw 203 represents allowable deflection of the shafts 166, 166' (say .001" for each) before the bearings 197, 197' begin to participate in carrying the load on the rolls. Thus the yoke assemblies used in the manner described carry a portion of the load imposed on the rolls and reduce the bending stresses in the drive shafts enabling keeping those stresses within allowable limits for relatively heavy roll loads.

Figure 30:
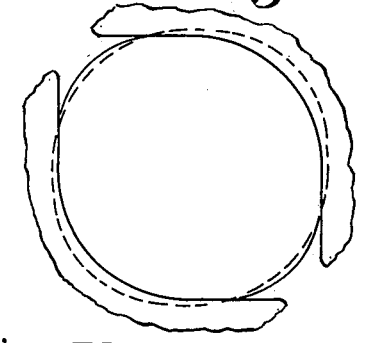
Figure 34:
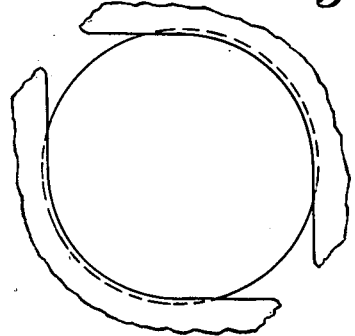
Figure 31:
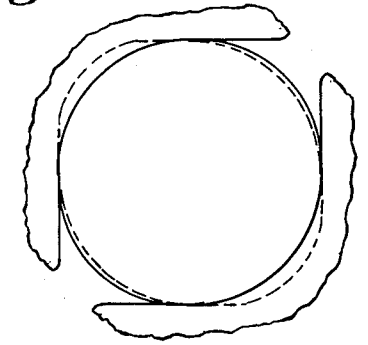
Figure 35:
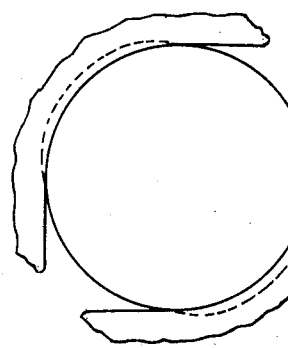

Referring to the mill layout shown in Figures 25 and 26, the bar reductions for which roll stands 161 and 162 are designed are small enough, as shown in Figures 30 and 31, to require but little help from flying traction vise 207 to force the leading ends of the bars through the rolls. The greater part of the power of the flying traction vise 207 is therefore available to pull a bar through the heavy reduction passes in roll stands 159 and 160 while feeding the leading end through roll stands 161 and 162 into position to be gripped by flying traction vise 208. The flying traction vise 208 does not serve only to tension the bar; the power of its motors and the power of the motors of the flying traction vise 207 may be fully utilized in conjunction with the mill motors to speed up the rolling operation when the leading end of a bar has been gripped by the flying traction vise 208.

The oversize end length rolled without benefit of tension (see Figure 31) represents a length of the original bar which, after reductions in roll stands 159 and 160, has been elongated to cover the distance from the center of the rolls in roll stand 159 to the leading end of the bar when gripped by flying traction vise 207 (with a flying traction vise capable of pulling thirty thousand pounds and with rolls 21" in diameter this distance is between 14 and 15').

The mill layout shown in Figures 25 and 26 is adapted for the cold rolling of straight lengths of precision rounds, preferably from hot-rolled rounds, coiled in long lengths for self-annealing and for economical pickling prior to cold rolling. I may employ a coil transfer, uncoiler and coil carrier of the type disclosed in my said application Serial No. 531,724 to handle and open the coils and to feed the ends of the bars to the belts of the flying traction vise 206. The product is preferably handled in the manner described in the same application.

Figure 27 shows my equipment for cold sizing of bars as it may be installed in a shipping building 214 having overhead crane runways 215. Hot-rolled bars may be delivered to a cooling bed 216 the end of which is shown in Figure 27 for cooling and transfer to shear table 217. Bars are cut into desired lengths by a shear 218 whence they are delivered by a table 219 to a cradle 220. The thus delivered bars are transported by an overhead crane to storage space 221 or to railroad cars on track 222.

I provide a skid bed 223 to which hot-rolled bars subject to sizing are transferred in batches by overhead crane from cradle 220. From bed 223 the bars are fed one by one on to a roller table 224 for delivery into engagement with the moving belts of flying traction vise 225. The flying traction vise 225 grips the bars and forces them through idler rolls of roll stands 226, 227 and 228 to position where they are gripped by the flying traction vise 229. The flying traction vise 229 pulls the bars through the rolls and delivers them to table 230 whence they move to transfer 231. On the transfer 231 the bars are collected in batches for delivery to shear table 232 and shear 233 where they are sheared in multiple to exact lengths or divided into short lengths. The sized and sheared bars are transferred by table 234 to cradle 235 for handling by overhead crane to storage 221 or to railroad cars on track 222.

The roll stands 226, 227 and 228 are of construction similar to the roll stand shown in Figures 23 and 24 except that the drive for the rolls is omitted. The rolls are mounted on idler shafts which are adjusted for pass opening. Alternate roll stands have the roll axes oriented at 90° to one another. Figures 36, 37 and 38 show roll passes for cold sizing $1^{39}/_{64}''$ hot-rolled rounds (subject to commercial tolerance requirements of plus or minus .014″) into 1½″ round at a tolerance of .001″.

Thus I hot-roll bars to a size slightly larger than the size required and then by utilizing my flying traction vise force or draw the cold bars through idler rolls to reduce them to required size. In view of the fact that the bars are prevented from turning on their axes due to the powerful grips of the flying traction vises and due to the small reductions the inaccuracies of the hot-rolled bars and the side spread are calculated to be reduced in the successive roll passes to produce the required size within tolerances not heretofore obtainable except by intermittent cold drawing in benches with reciprocating drawing mechanism. Compare Figures 36, 37 and 38. Since the idler rolls are free to revolve by contact with the moving bars any scale adhering to the bars from the hot rolling operation will not cause undue wear in the lubricated roll passes so that pickling for scale removal prior to cold rolling may be omitted. Pack annealing on the hot mill cooling bed is optional in view of the small cold reductions involved.

Referring again to Figures 32, 33, 34 and 35 showing an overall reduction of about 30% in section area it should be emphasized that the same mill equipment performing that work is capable of larger reductions on bars of smaller sizes. The amount of reduction which is feasible is limited by the hardening of the metal in the leading ends of the bars to not less than 50% of the original section area. Greater reduction may harden the leading ends of the bars until the roll passes are subject to damage unless the hardened ends are removed.

My apparatus is suitable for acting on bars of cross sections other than round, the dies or rolls and the grooves in the belts of the flying traction vises being shaped to cooperate with the bars being acted on.

Features of my invention described but not claimed herein are described and claimed in my divisional applications Serial Nos. 224,646 and 224,647, filed May 4, 1951.

While I have shown and described certain present preferred embodiments of the invention it is to be distinctly understood that the invention is not limited thereto but may be otherwise variously embodied within the scope of the following claims.

I claim:

1. A flying traction vise for advancing elongated articles in the direction of the length thereof comprising two generally coplanar endless traction elements having respectively opposed substantially parallel reaches, mounting means carrying each of the elements by which the element is supported and about which it is movable, means for driving the elements so that at said reaches thereof they move in the same direction at the same speed, means acting only on said reaches of said elements for rendering said elements simultaneously operative and inoperative throughout said reaches thereof to grip and release elongated articles and means for bodily relatively adjustably moving the elements, each with its mounting means, toward and away from each other.

2. A flying traction vise for advancing elongated articles in the direction of the length thereof comprising two pairs of shafts, all of the shafts having parallel axes, a rotatable traction element carrying member carried by each shaft, an endless traction element carried by and extending about each pair of said members, the two traction elements being generally coplanar and having respectively opposed substantially parallel reaches, means for driving the elements so that at said reaches thereof they move in the same direction at the same speed, means acting only on said reaches of said elements for rendering said elements quickly and simultaneously operative and inoperative throughout said reaches thereof to grip and release elongated articles and means for bodily relatively moving the pairs of shafts toward and away from each other to adjustably vary the distance between said reaches.

3. A flying traction vise for advancing elongated articles in the direction of the length thereof comprising two spaced apart housings, an upper and a lower shaft bearing in each housing, four shafts, one rotatably mounted in each bearing, the four shafts all having parallel axes, a rotatable traction element carrying member fixed to each shaft, an endless traction element carried by and extending about said members on the upper shafts, an endless traction element carried by and extending about said members on the lower shafts, the two traction elements being generally coplanar and having respectively opposed substantially parallel reaches, means for driving the elements so that at said reaches thereof they move in the same direction at the same speed, means for rendering said elements quickly and simultaneously operative and inoperative throughout said reaches thereof to grip and release elongated articles and means for relatively moving the bearings in each housing toward and away from each other to adjustably vary the distance between said reaches.

4. A flying traction vise for advancing elongated articles in the direction of the length thereof comprising two spaced apart housings, an upper and a lower shaft bearing in each housing, four shafts, one rotatably mounted in each bearing, the four shafts all having parallel axes, a rotatable traction element carrying member fixed to each shaft, an endless traction element carried by and extending about said members on the upper shafts, an endless traction element carried by and extending about said members on the lower shafts, the two traction elements being generally coplanar and having respectively opposed substantially parallel reaches, means for driving the elements so that at said reaches thereof they move in the same direction at the same speed, bearing actuating means connected with the upper and lower bearings in each housing effective upon operation for moving the bearings equal distances in opposite directions and operating means connected with the bearing actuating means in both housings operating the same synchronously whereby the distance between said reaches of the endless traction elements may be varied while maintaining said reaches at all times equidistant from a fixed pass line extending in the direction of advance of articles acted on by the vise.

5. A flying traction vise for advancing elongated articles in the direction of the length thereof comprising two spaced apart housings, an upper and a lower shaft bearing in each housing, four shafts, one rotatably mounted in each bearing, the four shafts all having parallel axes, a rotatable traction element carrying member fixed to each shaft, an endless traction element carried by and extending about said members on the upper shafts, an endless traction element carried by and extending about said members on the lower shafts, the two traction elements being generally coplanar and having respectively opposed substantially parallel reaches, means for driving the elements so that at said reaches thereof they move in the same direction at the same speed, a fixed member disposed in each housing intermediate the shaft bearings therein, oppositely handed nuts rotatably mounted in said fixed member in each housing, screws threaded into said nuts and bearing respectively against the top of the lower shaft bearing and the bottom of the upper shaft bearing in each housing, means maintaining the shaft bearings against the screws, means including a worm wheel for turning the nuts in each housing, a worm for operating each worm wheel and means for synchronously turning the worms whereby the distance between said reaches of the endless traction elements may be varied while maintaining said reaches at all times equidistant from a fixed pass line extending in the direction of advance of articles acted on by the vise.

6. A flying traction vise for advancing elongated articles in the direction of the length thereof comprising two generally coplanar endless traction elements having respectively opposed substantially parallel reaches, mounting means carrying each of the elements by which the element is supported and about which it is movable, means for driving the elements so that at said reaches thereof they move in the same direction at the same speed, means also carried by the mounting means for pressing said reaches toward each other to grip articles being acted on by the vise and means for operating said pressing means in unison to grip and release the articles.

7. A flying traction vise for advancing elongated articles in the direction of the length thereof comprising two generally coplanar endless traction elements having respectively opposed substantially parallel reaches, mounting means for each of the elements by which the element is supported and about which it is movable, means for driving the elements so that at said reaches thereof they move in the same direction at the same speed, means for bodily relatively adjustably moving the mounting means and the elements toward and away from each other to accommodate the vise to elongated articles of different transverse dimensions and means carried by the mounting means for additional movement of said reaches independently of said mounting means for pressing said reaches toward each other to grip the articles.

8. A flying traction vise for advancing elongated articles in the direction of the length thereof comprising two generally coplanar endless traction elements having respectively opposed substantially parallel reaches, mounting means for each of the elements by which the element is supported and about which it is movable, means for driving the elements so that at said reaches thereof they move in the same direction at the same speed, means for bodily relatively adjustably moving the mounting means and the elements toward and away from each other to accommodate the vise to elongated articles of different transverse dimensions and a series of pressing elements each of which is separately movable and effective for pressing a portion of said reaches to grip the articles.

9. A flying traction vise for advancing elongated articles in the direction of the length thereof comprising two generally coplanar endless traction elements having respectively opposed substantially parallel reaches, mounting means for each of the elements by which the element is supported and about which it is movable, means for driving the elements so that at said reaches thereof they move in the same direction at the same speed, means for bodily relatively adjustably moving the mounting means and the elements toward and away from each other to accommodate the vise to elongated articles of different transverse dimensions and pressing elements adapted to furnish desired and substantially uniform pressure per unit of length of the article acted on irrespective of the position of the ends of the article within said reaches when advancing articles into and out of the vise.

10. A flying traction vise for advancing elongated articles in the direction of the length thereof comprising two generally coplanar endless traction elements having respectively opposed substantially parallel reaches, mounting means for each of the elements by which the element is supported and about which it is movable, means for driving the elements so that at said reaches thereof they move in the same direction at the same speed, means for bodily relatively adjustably moving the mounting means and the elements toward and away from each other to accommodate the vise to elongated articles of different transverse dimensions, means carried by the mounting means for additional movement of said reaches independently of said mounting means for pressing said reaches toward each other to grip the articles and means for adjusting the pressing means for desired traction independently of adjustment of the mounting means.

11. A flying traction vise for advancing elongated articles in the direction of the length thereof comprising two supports, two generally coplanar endless traction elements having respectively opposed substantially parallel reaches and respectively carried by the supports, means for driving the elements so that at said reaches thereof they move in the same direction at the same speed, means carried by and movable relatively to the supports for pressing said reaches toward each other to grip articles being acted on by the vise, toggle joint means for operating the pressing means, means for limiting the amplitude of movement of the toggle joint means, the toggle joint means comprising arms mounted to assume generally in-line position when the pressing means are operative and means for adjustably positioning the last-mentioned means in the direction parallel to said reaches to determine the pressure applied by the pressing means.

12. A flying traction vise for advancing elongated articles in the direction of the length thereof comprising two generally coplanar endless traction elements having respectively opposed substantially parallel reaches, means for driving the elements so that at said reaches thereof they move in the same direction at the same speed, crank means, pressing means mounted on the crank means for movement upon turning of the crank means generally toward said reaches and also longitudinally thereof and means connected with the pressing means urging the same generally toward said reaches and longitudinally thereof to cause the same to turn the crank means and move into pressing relationship with said reaches.

13. A flying traction vise for advancing elongated articles in the direction of the length thereof comprising two supports, two generally coplanar endless traction elements having respectively opposed substantially parallel reaches and relatively carried by the supports, means for driving the elements so that at said reaches thereof they move in the same direction at the same speed, means carried by and movable relatively to the supports for pressing said reaches toward each other to grip articles being acted on by the vise and means including fluid pressure operated means and a toggle joint for operating the pressing means and comprising a piston connected with the pressing means and means for limiting movement of the piston in each direction, said limiting means being separately adjustable parallel to the direction of movement of the piston, the toggle joint means comprising arms mounted to assume generally in-line position when the pressing means are operative.

14. A flying traction vise for advancing elongated articles in the direction of the length thereof comprising two generally coplanar endless traction elements having respectively opposed substantially parallel reaches, means for driving the elements so that at said reaches thereof they move in the same direction at the same speed, means for pressing said reaches toward each other to grip articles being acted on by the vise and means including fluid pressure operated means for operating the pressing means and comprising a cylinder, a piston in the cylinder, a piston rod connecting the piston and the pressing means, the cylinder limiting movement of the piston in one direction, and a stop cooperating with the piston rod limiting movement of the piston in the opposite direction, the cylinder and the stop being separately adjustable parallel to the direction of movement of the piston.

15. A flying traction vise for advancing elongated articles in the direction of the length thereof comprising two generally coplanar endless traction elements having respectively opposed substantially parallel reaches, means for driving the elements so that at said reaches thereof they move in the same direction at the same speed, means for pressing said reaches toward each other to grip articles being acted on by the vise and means including fluid pressure operated means for operating the pressing means and comprising a cylinder, a piston in the cylinder, a piston rod connecting the piston and the pressing means, the cylinder limiting movement of the piston in one direction, a stop cooperating with the piston rod limiting movement of the piston in the opposite direction and means including screw means for separately adjusting the cylinder and the stop parallel to the direction of movement of the piston.

16. A flying traction vise for advancing elongated articles in the direction of the length thereof comprising two spaced apart housings, an upper and a lower shaft bearing in each housing, four shafts, one rotatably mounted in each bearing, the four shafts all having parallel axes, a rotatable traction element carrying member fixed to each shaft, an endless traction element carried by and extending about said members on the upper shafts, an endless traction element carried by and extending about said members on the lower shafts, the two traction elements being generally coplanar and having respectively opposed substantially parallel reaches, means for driving the elements so that at said reaches thereof they move in the same direction at the same speed, a carrier supported by both of the upper shaft bearings and spanning the space therebetween, a carrier supported by both of the lower shaft bearings and spanning the space therebetween and opposed pressing members, one carried by each carrier, movable relatively to the carriers toward each other to press toward each other said reaches of the endless traction elements.

17. A flying traction vise for advancing elongated articles in the direction of the length thereof comprising two generally coplanar endless traction elements having respectively opposed substantially parallel reaches, mounting means carrying each of the elements by which the element is supported and about which it is movable, means for driving the elements so that at said reaches thereof they move in the same direction at the same speed, tensioning devices also carried respectively by the mounting means and bearing directly against the endless traction elements for tensioning the endless traction elements to take up slack therein and means for adjustably moving the mounting means in unison in opposite directions.

18. A flying traction vise for advancing elongated articles in the direction of the length thereof comprising two generally coplanar endless traction elements having respectively opposed substantially parallel reaches, two mounting structures, one for each of the elements, by which the elements are respectively supported, means for driving the elements so that at said reaches thereof they move in the same direction at the same speed, a tensioning device carried by each of the two mounting structures and bearing directly against the endless traction element supported thereby for tensioning the endless traction element supported thereby and means for adjustably moving the mounting structures in unison in opposite directions.

19. A flying traction vise for advanced elongated articles in the direction of the length thereof comprising two generally coplanar endless traction elements having respectively opposed substantially parallel reaches, each of the endless traction elements comprising an inner portion and an outer article engaging portion, two mounting structures, one for each of the elements, by which the elements are respectively supported, means for driving the elements so that at said reaches of the elements they move in the same direction at the same speed and two tensioning devices carried by each of the two mounting structures for tensioning the inner portion and the outer article engaging portion of the endless traction element supported thereby.

20. A flying traction vise for advancing elongated articles in the direction of the length thereof comprising sprocket means having transversely spaced apart sets of teeth, a sprocket chain with which the sprocket means mesh, the sprocket chain having outside links at both sides disposed outside the respective sets of teeth of the sprocket means and inside links disposed between the sets of teeth of the sprocket means, and a belt lying against the inside links between the sets of teeth of the sprocket means and adapted to engage elongated articles to advance the same upon movement of the sprocket chain and belt about the sprocket means.

21. A flying traction vise for advancing elongated articles in the direction of the length thereof comprising sprocket means having transversely spaced apart sets of teeth, a sprocket chain with which the sprocket means mesh, the sprocket chain having outside links at both sides disposed outside the respective sets of teeth of the sprocket means, inside links disposed between the sets of teeth of the sprocket means, pivot pins extending transversely of the sprocket chain and passing through the outside and inside links and antifriction rollers disposed about the pivot pins between the inside and outside links to bear against the sprocket teeth, and a belt lying against the inside links between the sets of sprocket teeth and adapted to engage elongated articles to advance the same upon movement of the sprocket chain and belt about the sprocket means.

22. A flying traction vise for advancing elongated articles in the direction of the length thereof comprising sprocket means having transversely spaced apart sets of teeth, a sprocket chain with which the sprocket means mesh, the sprocket chain having outside links at both sides disposed outside the respective sets of teeth of the sprocket means and inside links disposed between the sets of teeth of the sprocket means, the inside links having generally flat belt supporting surfaces and opposed guide ribs, and a belt lying against said surfaces and between said guide ribs and adapted to engage elongated articles to advance the same upon movement of the sprocket chain and belt about the sprocket means.

23. A flying traction vise for advancing elongated articles in the direction of the length thereof comprising an endless sprocket chain, sprocket means with which the endless sprocket chain meshes for driving the same, means mounted generally within the endless sprocket chain and in proximity to a reach thereof for backing up the chain to assist in applying pressure to articles being advanced, the backing up means having antifriction rollers whose axes are parallel to each other and to the axes of the pivot pins of the sprocket chain, the axes of the rollers being spaced apart a distance unequal to the distance between the axes of the pivot pins of the sprocket chain, and means for rapidly shifting the backing up means in a direction transversely of said reach of the endless sprocket chain.

24. A flying traction vise for advancing elongated articles in the direction of the length thereof comprising an endless sprocket chain, sprocket means with which the endless sprocket chain meshes for driving the same and means mounted generally within the endless sprocket chain and in proximity to a reach thereof for backing up the chain to assist in applying pressure to articles being advanced, the backing up means having antifriction rollers whose axes are parallel to each other and to the axes of the pivot pins of the sprocket chain, the axes of the rollers being spaced apart a distance differing but slightly from the distance between the axes of the pivot pins of the sprocket chain.

25. A flying traction vise for advancing elongated articles in the direction of the length thereof comprising an endless traction element, means for driving the endless traction element and means mounted generally within the endless traction element and in proximity to a reach thereof for backing up the endless traction element to assist in applying tractive pressure to articles being advanced, the backing up means having a series of antifriction rollers against which the endless traction element is adapted to lie, the axes of the rollers extending transversely of the endless traction element, at least some of the rollers having flange means for guiding the endless traction element relatively to the backing up means.

26. A flying traction vise for advancing elongated articles in the direction of the length thereof comprising an endless traction element and means for driving the endless traction element, the endless traction element having a continuous outer portion of resilient material which engages the articles and has an outwardly open depression extending therealong, said depression being normally of smaller transverse dimension than the portions of the articles to be engaged thereby so that when said portion of the endless traction element is pressed against said articles it is caused by said articles to spread transversely and thus firmly grip said articles.

References Cited in the file of this patent

UNITED STATES PATENTS

| Number | Name | Date |
|---|---|---|
| 284,700 | Williams | Sept. 11, 1883 |
| 342,474 | Svenson | May 25, 1886 |
| 499,677 | Daelen | June 13, 1893 |
| 548,637 | Greenfield | Oct. 29, 1895 |
| 699,133 | Allis | May 6, 1902 |
| 1,153,183 | Aicher | Sept. 14, 1915 |
| 1,904,885 | Seeley | Apr. 18, 1933 |
| 2,071,999 | Dike | Feb. 23, 1937 |
| 2,212,132 | Shear | Aug. 20, 1940 |
| 2,251,291 | Reichelt | Aug. 5, 1941 |
| 2,339,761 | Bruestle | Jan. 25, 1944 |
| 2,387,446 | Herz | Oct. 23, 1945 |
| 2,438,448 | Morton et al. | Mar. 23, 1948 |
| 2,642,280 | Fisk | June 16, 1953 |

FOREIGN PATENTS

| Number | Country | Date |
|---|---|---|
| 572,968 | Great Britain | Oct. 31, 1945 |